United States Patent [19]
Yoshida et al.

[11] Patent Number: 5,619,344
[45] Date of Patent: Apr. 8, 1997

[54] IMAGE PROCESSING APPARATUS FOR RECORDING A PLURALITY OF SETS OF IMAGE DATA

[75] Inventors: Takehiro Yoshida, Tokyo; Toru Nakayama, Yokohama, both of Japan

[73] Assignee: Canon Kabushiki Kaisha, Tokyo, Japan

[21] Appl. No.: 338,772

[22] Filed: Nov. 10, 1994

[30] Foreign Application Priority Data

Nov. 18, 1993 [JP] Japan ................................. 5-312731

[51] Int. Cl.$^6$ .............................. H04N 1/00; H04N 1/21
[52] U.S. Cl. .................... 358/468; 358/401; 358/296; 358/441
[58] Field of Search ................................. 358/400, 401, 358/406, 439, 441, 442, 449, 468, 296; 355/316–317; H04N 1/00

[56] References Cited

U.S. PATENT DOCUMENTS

| | | |
|---|---|---|
| 4,554,592 | 11/1985 | Yoshida ................................. 358/257 |
| 5,019,916 | 5/1991 | Ogura . |
| 5,096,180 | 3/1992 | Nagaoka et al. . |
| 5,208,681 | 5/1993 | Yoshida ................................. 358/404 |

*Primary Examiner*—Edward L. Coles, Sr.
*Assistant Examiner*—Kimberly A. Williams
*Attorney, Agent, or Firm*—Fitzpatrick, Cella, Harper & Scinto

[57] ABSTRACT

A facsimile apparatus having a multi-output recording mode for producing a plurality of sets of output record of the received data. The multi-output recording mode is selectively prohibited when the number of the recording paper sheets remaining in the facsimile apparatus has become small, so that as many communications as possible can be recorded. The facsimile apparatus has a recognizing device for recognizing the number of recording sheets remaining therein, and a control unit which performs such a control that, when the number of the sheets recognized by the recognizing device has come down below a predetermined value, only one set of the output record is produced, even when a communication designated for the multi-output recording has been selected. An indication circuit is provided to enable indication of the fact that, although multi-output recording was planned initially, only one set of output record has been produced due to a shortage of the recording sheets. The indication is added to the received image data or to the data to be output as the communication result report.

22 Claims, 21 Drawing Sheets

FIG. 17

FACSIMILE DEVELOPING DEPT.

MR. YOSHIDA   MR. ISHIDA

MR. TODA      MR. SHINADA

I WISH YOU A HAPPY NEW YEAR.

FIG. 18(1)

FACSIMILE DEVELOPING DEPT.

| MR. YOSHIDA |　MR. ISHIDA

MR. TODA　　　MR. SHINADA

I WISH YOU A HAPPY NEW YEAR.

FIG. 18(2)

FACSIMILE DEVELOPING DEPT.

MR. YOSHIDA　| MR. ISHIDA |

MR. TODA　　　MR. SHINADA

I WISH YOU A HAPPY NEW YEAR.

FIG. 21

| | | |
|---|---|---|
| SHINJUKU | MR. YOSHIDA | MR. ISHIDA |
| SHIMOMARUKO | MR. TODA | MR. SHINADA |
| AMI | MR. EDA | MR. WADA |

I WISH YOU A HAPPY NEW YEAR.

FIG. 22(1)

| | | |
|---|---|---|
| SHINJUKU | MR. YOSHIDA | MR. ISHIDA |
| SHIMOMARUKO | [MR. TODA] | MR. SHINADA |
| AMI | MR. EDA | MR. WADA |

I WISH YOU A HAPPY NEW YEAR.

FIG. 22(2)

| | | |
|---|---|---|
| SHINJUKU | MR. YOSHIDA | MR. ISHIDA |
| SHIMOMARUKO | MR. TODA | [MR. SHINADA] |
| AMI | MR. EDA | MR. WADA |

I WISH YOU A HAPPY NEW YEAR.

FIG. 23

| | | |
|---|---|---|
| SHINJUKU | MR. YOSHIDA | MR. ISHIDA |
| SHIMOMARUKO | MR. TODA | MR. SHINADA |
| | CC  MR. HARADA | MR. SENDA |
| AMI | MR. EDA | MR. WADA |

I WISH YOU A HAPPY NEW YEAR.

FIG. 24(1)

| | | |
|---|---|---|
| SHINJUKU | MR. YOSHIDA | MR. ISHIDA |
| SHIMOMARUKO | MR. TODA | MR. SHINADA |
| | CC  [MR. HARADA] | MR. SENDA |
| AMI | MR. EDA | MR. WADA |

I WISH YOU A HAPPY NEW YEAR.

FIG. 24(2)

| | | |
|---|---|---|
| SHINJUKU | MR. YOSHIDA | MR. ISHIDA |
| SHIMOMARUKO | MR. TODA | MR. SHINADA |
| | CC  MR. HARADA | [MR. SENDA] |
| AMI | MR. EDA | MR. WADA |

I WISH YOU A HAPPY NEW YEAR.

IMAGE PROCESSING APPARATUS FOR RECORDING A PLURALITY OF SETS OF IMAGE DATA

BACKGROUND OF THE INVENTION

1. Field of the Invention

The present invention relates to a facsimile apparatus of the type which is capable of producing a plurality of sets of output print sheets for the same received information.

2. Description of the Related Art

A facsimile apparatus has been known which has a so-called "multi-output mode" for producing a plurality of sets of output prints for identical data received by the facsimile apparatus. When a communication bound for multi-output operation has been selected in a known facsimile apparatus of the kind described, the multi-output recording is performed based solely on whether there is any recording paper sheet remaining in the facsimile apparatus, regardless of whether or not the number of the sheets available therein suffices for the multiple output recording.

A problem is therefore encountered that, when the multi-output recording is executed while the number of the recording paper sheets available is small, the desired number of the output record sets may not be obtained due to exhaustion of the recording paper sheets during the printing.

A problem also is encountered in regard to communication during evening or off-business hours, particularly when the number of recording paper sheets remaining in the facsimile apparatus is small. In such a case, it is preferred that the multi-output recording is restrained to enable output recording of many communications as possible. Namely, if multi-output recording is performed in a communication bound for multi-output recording, the facsimile apparatus may consume all or almost all the recording paper sheets remaining therein, failing to record data of communications which may follow the multi-output communication and which may contain important or urgent information.

SUMMARY OF THE INVENTION

Accordingly, it is an object of the present invention to provide an improved facsimile apparatus which can eliminate the above-described problems of the known art.

It is another object of the present invention to provide a facsimile apparatus which affords an efficient use of recording paper sheets remaining therein.

It is still another object of the present invention to provide a facsimile apparatus which can cope with various demands of users while minimizing inconveniences.

To these ends, according to one aspect of the present invention, there is provided a facsimile apparatus comprising: recognizing means for recognizing the number of recording paper sheets remaining in the facsimile apparatus; recording means capable of producing a plurality of sets of output record of the received picture data; and control means which causes the recording means to produce only one set of the output record when the number of the sheets recognized by the recognized means is not greater than a predetermined value.

These and other objects, features and advantages of the present invention will become clear from the following description of the embodiments taken in conjunction with the accompanying drawings.

BRIEF DESCRIPTION OF THE DRAWINGS

FIG. 17 is an illustration of an image to be transmitted from a transmission side of the thirteenth embodiment;

FIG. 18 is an illustration of an image received at the receiving side of the thirteenth embodiment;

FIG. 21 is an illustration of an image to be transmitted from a transmission side of the sixteenth embodiment;

FIG. 22 is an illustration of an image received at the receiving side of the sixteenth embodiment;

FIG. 23 is an illustration of an image to be transmitted from a transmission side of a nineteenth embodiment; and FIG. 24 is an illustration of an image received at the receiving side of the nineteenth embodiment;

DESCRIPTION OF THE PREFERRED EMBODIMENTS

Figure 1:
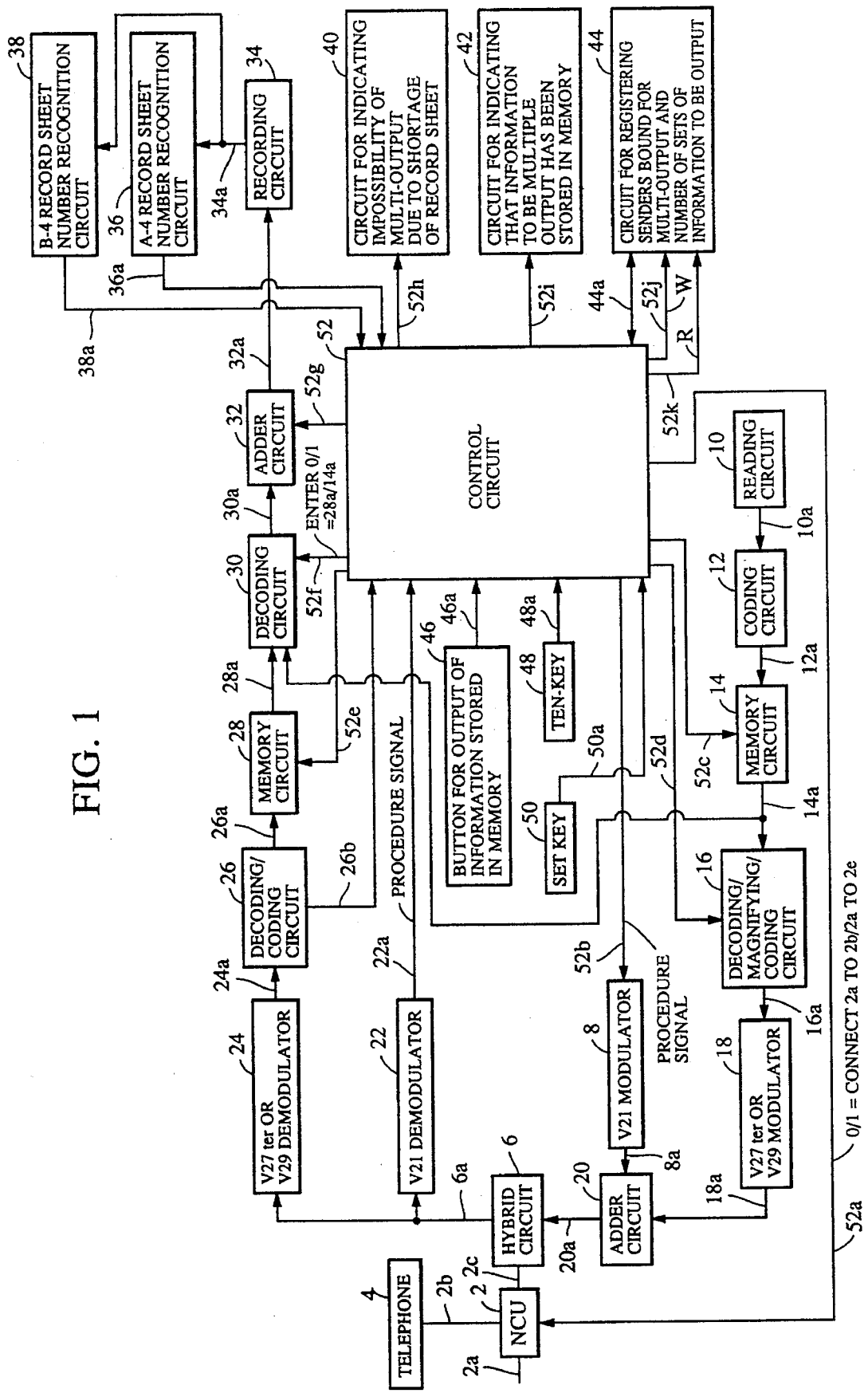
FIG. 1 is a block diagram showing the construction of a first embodiment of the present invention.

FIG. 1 is a block diagram showing the construction of a facsimile apparatus which is an embodiment of the present invention.

Referring to this Figure, a network control unit 2 (referred to also as NCU 2, hereinafter) is connected to an end of a telephone communication line so as to make it possible to use a telephone network for the purpose of data communication, and performs various controls such as control of connection to the telephone exchange network, switching to a data transmission line, holding of a loop, and so forth. When the level of a signal on a signal line 52a from a control circuit 52 is "0", the NCU 2 operates to connect the telephone circuit 2a to a telephone 4, whereas, when the signal level is "1", the NCU 2 operates to connect the telephone circuit 2a to a facsimile apparatus. Usually, the telephone circuit 2a is connected to the telephone 4.

A hybrid circuit 6 separates a signal on a transmission system and a signal on a receiving system from each other. The hybrid circuit 6 operates to deliver a transmission signal from an adder circuit 20 to the telephone circuit 2a via the NCU 2 and also to receive a signal from an opposite station via the NCU 2 so as to deliver the received signal to a V29 demodulator 24 and a V21 demodulator 22 through a signal line 6a.

A V21 modulator 8 performs modulation in accordance with CCITT recommendation V21 which is well known. More specifically, it modulates a procedure signal on the signal line 52b from the control circuit 52 and delivers the modulated signal to the adder circuit 20 through a signal line 8a.

A reading circuit 10 reads, from a transmitted original, main-scan line picture signals for successive lines of main scan, in a line-by-line fashion, and forms trains of binary signals each having eighth white or black level so as to form serial data. The reading circuit 10 then sends the read data to a coding circuit 12 through a signal line 10a. The reading circuit 10 comprises an imaging device such as CCD (charge-coupled device) and an optical system.

The coding circuit 12 receives read data supplied through the signal line 10a and performs coding of the data, specifically MR coding with k=8, and delivers the result of coding, to a memory circuit 14, through the signal line 12a.

The memory circuit 14 stores the data available on the signal line 12a in accordance with a control signal 52c supplied thereto from the control circuit 52 through a signal line 52c. The memory circuit 14 also delivers the data stored therein to a decoding/magnifying/coding circuit 16 and a decoding circuit 30, through a signal line 14a.

The decoding/magnifying/coding circuit 16 receives, in accordance with a control signal supplied thereto from the control circuit 52 via a signal line 52d, the coded data available on the signal line 14a and temporarily decodes the data, followed by magnification/demagnification in a main and/or a sub-scan direction, as required, and a subsequent coding. The coded data thus obtained is output to a modulator 18 through a signal line 16a.

The modulator 18 which is a V27 ter or V29 modulator receives the coded data coming through the signal line 16a and performs modulation of the data in accordance with V27ter (differential phase modulation) or V29 (orthogonal modulation) recommended by CCITT which is known, and delivers the resultant modulated data to the adder circuit through the signal line 18a.

The adder circuit 20 is a circuit which adds the outputs of the modulators 8 and 18. The output of the adder circuit 20 is delivered to the hybrid circuit 6.

A V21 demodulator 22 performs demodulation in accordance with CCITT recommendation V21 which is known. The demodulator 22 receives a procedure signal from the hybrid circuit 6 via a signal line 6a, performs the V21 demodulation and delivers the result and demodulated data to the control circuit 52 through a signal line 22a.

A demodulator 24 which is a V27ter or V29 demodulator performs demodulation in accordance with V27ter or V29 of CCITT recommendation which is known. The demodulator 24 receives modulated picture signals from the hybrid circuit 6, demodulates these picture signals and then delivers the resultant demodulated data to a decoding/coding circuit 26 through a signal line 24a.

The decoding/coding circuit 26 receives the demodulated data supplied thereto through the signal line 24a, decodes the received signals and then delivers the decoded data to the control circuit 52 via a signal line 26b. At the same time, the decoding/coding circuit 26 codes the decoded data again with k=8 mode, and supplies the resultant data to a memory circuit 28 through a signal line 26a.

The memory circuit 28 operates in accordance with control signal supplied thereto from the control circuit 52 via a signal line 52e, so as to store the data available on the signal line 26a, and delivers the stored data to a decoding circuit 30 through a signal line 28a.

When a signal of "0" level exists on a signal line 52f from the control circuit 52, the decoding circuit 30 operates to receive the data from the signal line 28a, whereas, when a signal of "1" level exists, it receives data from the signal line 14a. The thus received data is decoded (MR decoding with k=8) and is delivered to a signal line 30a.

An adder circuit 32 receives data both from the signal line 52g and the signal line 30a, adds them together to form a sum and delivers the sum to a signal line 32a.

A recording circuit 34 receives data from the signal line 32a, and performs recording of successive line signals in a line-by-line fashion. The recording, however, may be done in a page-by-page manner. Sheet-stack height information, indicative of the numbers of the A-4 size sheets and B-4 side sheets remaining in the facsimile apparatus, is delivered to a signal line 34a.

An A-4 record sheet number recognition circuit 36 receives the A-4 size sheet stack height information available on the signal line 34a and recognizes the number of A-4 size sheets remaining in the facsimile apparatus based on the information. A signal indicative of the number of the A-4 size sheet is output through a signal line 36a.

A B-4 record sheet number recognition circuit 38 receives the B-4 size sheet stack height information available on the signal line 34a and recognizes the number of B-4 size sheets remaining in the facsimile apparatus based on the information. A signal indicative of the number of the B-4 size sheet is output through a signal line 38a.

An indicator circuit 40 is a circuit which indicates that, although a communication requesting multiple output recording has been set, it is impossible to produce the required number of sets of the output record due to shortage of the record sheets remaining in the facsimile apparatus. More specifically, the circuit 40 does not perform the indication when a signal of "0" level is available on a signal line 52h from the control circuit 52, whereas, when a signal of "1" level exists on the signal line 52h, it performs the indication.

A circuit 42 is a circuit which indicates that a communication requesting multiple output recording has been conducted and picture information received through this communication has been stored in a memory circuit 28. The circuit 42 does not perform the indication when a signal of "0" level is available on a signal line 52i from the control circuit 52, whereas, when a signal of "1" level exists on the signal line 52i, it performs the indication.

A registration circuit 44 can register up to 100 (one hundred, 00 to 99) sending stations (stations from which the facsimile apparatus receives transmissions) the transmissions from which are bound to be output in plural, as well as the number of sets of output to be produced for each of such stations. The registration is made in terms of the facsimile telephone numbers of such sender stations, together with the numbers of sets of output to be produced.

The registration can be done by, for example, setting a series of signals on a signal line 44a, the signal series including a code number (one from among 00 to 99, e.g., 08) of the sending station to be registered, a space, the facsimile telephone number of the sending station, e.g., 03-3111-2222, a space, and a number of output records, e.g., 5, to be produced at such station, followed by generation of a write pulse on a signal line 52j. Reading of information registered in the circuit 44 is done by outputting the code number, e.g., 08, of the destination to the signal line 44a, followed by generation of a read pulse on a signal line 52k, so that the series of information stored in relation to the code number, such as the facsimile telephone number of the sender station, e.g., 03-3111-2222, a space and the number of sets of the output records to be produced, e.g., 5, are successively output to the signal line 44a.

An output button 46, when pressed down, produces a press-down pulse on a signal line 46a, to trigger outputting of image information which has been stored in the memory and which is intended to be output for multiple sets of output records.

A ten-key device 48 is used for dialing. Ten-key information produced as a result of pressing down of selected keys on the ten-key device 48 is output to a signal line 48a. A set key device 50 is used for setting various modes of operation. A press-down pulse is generated on the signal line 50a in response to pressing down of one of the keys of the set key device 50.

The control circuit 52 performs such a control that, even when a communication has been set requesting production of multiple sets of output records, only one set of output record is produced, in the event that the number of the recording paper sheets has come down below a predetermined number. The control circuit 52 also adds, to the single set of the output record or to a communication result report, image information which indicates that, although multi-output recording was planned initially, only one set of output record has been formed because of shortage of the number of recording paper sheets remaining in the facsimile apparatus, together with image information indicating the station by which the multiple output records was intended to be produced. When the facsimile apparatus is designed to hold a plurality of sizes of recording paper sheets, the number of recording sheets remaining and available for recording is determined on the basis of the number of sheets of the size which corresponds to the size appointed in the communication.

Figure 2:
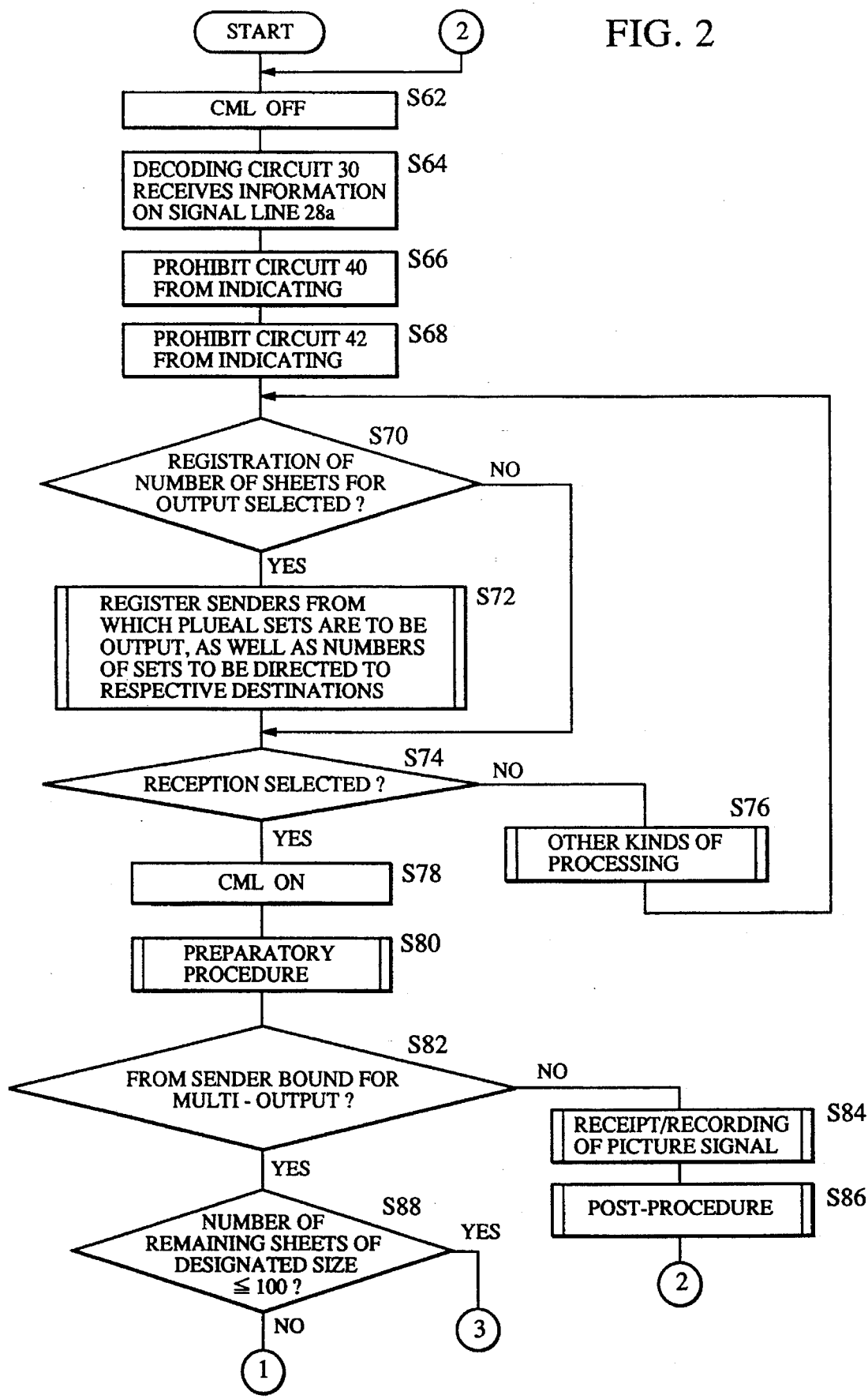
FIG. 2 is a flow chart illustrative of the operation of the first embodiment.
Figure 3:
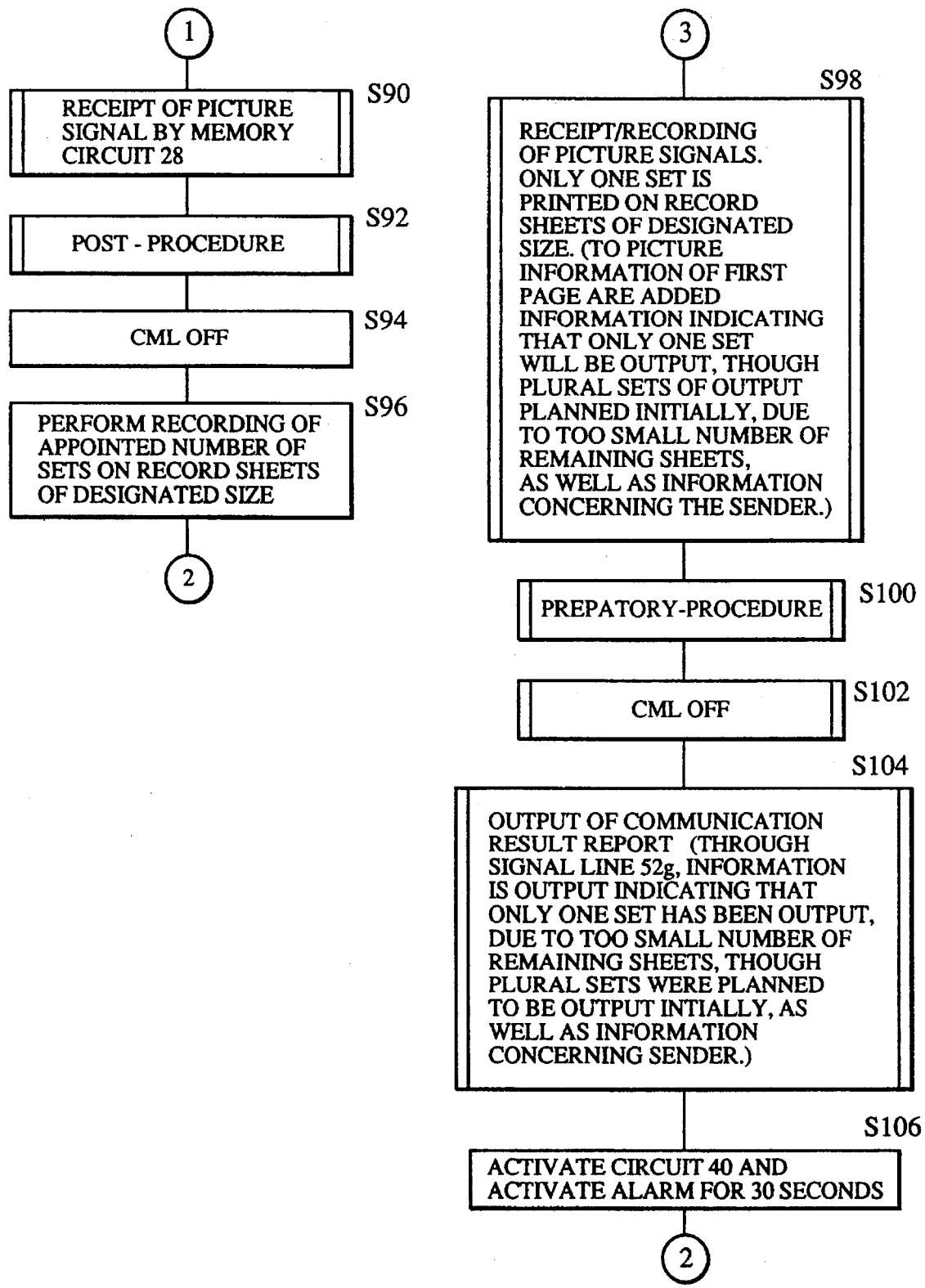
FIG. 3 is another flow chart illustrative of the operation of the first embodiment.

FIGS. 2 and 3 are flow charts illustrative of the operation of the first embodiment of the present invention.

In Step S62, a signal of "0" level is output to the signal line 52a to turn off CML (connect modem to line). In Step S64, a signal of "0" level is delivered to the signal line 52f so as to set the decoding circuit 30 to a state ready for receiving the information from the signal line 28a.

In Step S66, a signal of "0" level is output to the signal line 52h so as to prohibit the indication circuit 40 from operating. In Step S68, a signal of "0" level is output to the signal line 52i, so as to prohibit the indication circuit 42 from indicating.

In Step S70, a determination is made as to whether a mode has been selected for the registration of a sending station bound for multi-output, as well as the number of the sets of output records to be obtained. If this registration has been selected, the process proceeds to Step S72 which registers in the circuit 44 the sending station bound for the multiple output records and the number of the sets of output records to be produced. If the mode for registration has not been selected, the process proceeds to Step S74.

In Step S74, a determination is made as to whether the reception has been selected. If reception has been selected, the process proceeds to Step S78, whereas, if not, the process proceeds to Step S76 to execute other types of processing.

In Step S78, a signal of "1" level is output to the signal line 52a to turn the CML on, followed by execution of preparatory procedure in Step S80.

In Step S82, information registered in the registration circuit 44 is received, and a determination is made on the basis of the information as to whether the reception is from a sending station for which multiple output record production is registered at the receiving station. If the reception is from such a station, the process proceeds to Step S88, whereas, if not, the process proceeds to Step S84.

Step S84 executes receiving of the picture signals and production of only one set of output record, followed by execution of a post-procedure in Step S86.

In Step S88, information is derived from the sinal line 36a when the recording is to be done on A-4 size sheets so as to detect the number of the A-4 size record sheets remaining and available for the recording, and from the signal line 38a when the recording is to be done on B-4 size sheets so as to detect the number of the B-4 size record sheets remaining and available for the recording. Based on the number of the remaining record sheets, Step S88 also determines whether the number of the remaining record sheets of the designated size is greater than 100 or not.

If the number of the remaining sheets of the designated size is less than or equal to 100, the process advances to Step S98, whereby only one set of output record is produced and, at the same time, information is added to the picture information of the image of the first page of the produced set of output record and to the communication result report to inform that, despite a request for producing plural sets of output record, only one set has been produced due to a too small number of the remaining sheets. Conversely, when the number of the remaining sheets of the designated size exceeds 100, the process advances to Step S90.

In Step S90, received information is sent through the signal line 52e to the memory circuit 28 so as to be stored in the latter, followed by execution of post-procedure in Step S92. In Step S94, signal of "0" level is output to the signal line 52a so as to turn CML off. In Step S96, instruction is given through the signal line 52e to perform production of the appointed number of sets of output records on the record sheets of the designated size.

Upon receipt of instructions, the memory circuit 28 sends picture data in page-by-page fashion to the decoding circuit 30. The decoding circuit 30 decodes the picture data and repeatedly sends the decoded picture data to the recording circuit 34 via the adder circuit. The number of repetition equals to the designated number of sets of record to be produced. Thus, even when a plurality of sets of record are to be produce, only one decoding operation suffices for each page of picture data, which eliminates any waste of time.

When the number of the recording paper sheets remaining in the facsimile apparatus is insufficient to print all the sets requested, the operation is forcibly switched to a mode which produces only one set of record, thus preventing exhaustion of recording paper before completion of the recording to the last page of the picture data. This forcible change of operation to the mode for producing only one set of record also is executed in other embodiments.

In Step S98, instruction is given through the signal line 52e so that reception and recording of picture signals are conducted. In this case, only one set of output record is produced, and image information is added through the signal line 52g to a portion of the received image information to indicate that, although multi-output recording was planned initially, only one set of output record has been formed because of a shortage of the number of recording paper sheets remaining in the facsimile apparatus, together with image information indicating the sending station from which the multi-output recording was initially planned.

Step S100 perform preparatory procedure and, in Step S102, a signal of "0" level is output to the signal line 52a so as to turn the CML off. Communication result report is output in Step S104. In this case, an image is added to the report through the signal line 52g to indicate that, although production of a plurality of sets of output record were planned to be produced, only one set has been produced due to too small number of record sheets remaining and available for recording, as well as information indicative of the sending station from which the information planned to be output in plural was sent.

In Step S106, a signal of "1" level is supplied to the signal line 52h so that a message indicating that the multi-output recording cannot be done because of shortage of the recording paper sheets is displayed by the indicating circuit 40. Then, after activating the alarm for 30 seconds, the process proceeds to Step S62. Thus, the display by the indicating circuit 40 is maintained for 30 seconds.

A description will now be given of the second embodiment of the invention. In the first embodiment described above, the number of the recording paper sheets remaining and available for recording is determined for the sheet of the designated size, among a plurality of types of sheets of different sizes which are set in the facsimile apparatus. In contrast, in the second embodiment, the number of the recording sheets remaining and available for recording is determined based on the total number of the recording paper sheets of different sizes.

Figure 4:
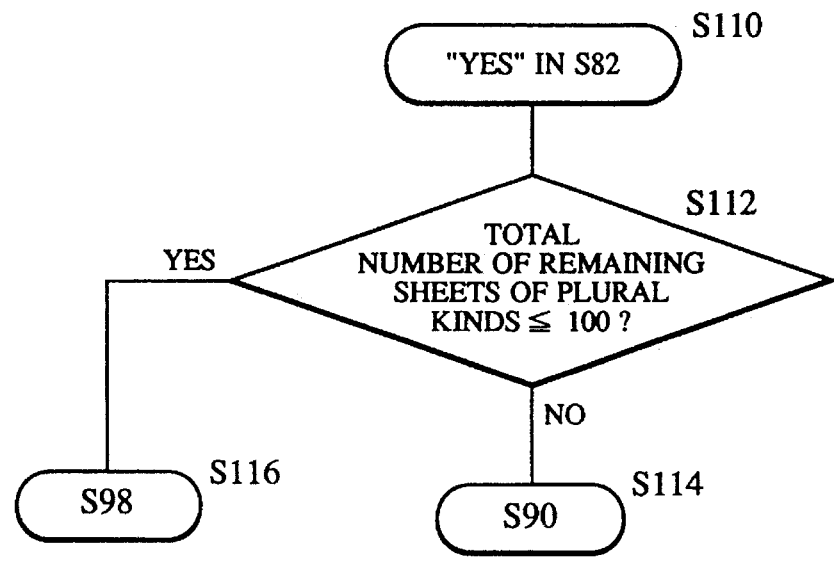
FIG. 4 is a flow chart illustrative of the operation of a second embodiment.

FIG. 4 is a flow chart illustrative of the operation of the second embodiment, showing particularly a portion of the operation which distinguishes the second embodiment from the first embodiment.

Step S110 corresponds to "YES" in Step S82 of the process explained in connection with the first embodiment. In Step S112, two kinds of information are derived from signal lines 36a and 38a so as to enable a determination as to whether the total number of the recording paper sheets of different sizes is greater than 100. If the total number of sheets is 100 or less, the process proceeds to Step S116 (corresponding to Step S98 of FIG. 3), whereas, if the total number of sheets is greater than 100, the process advances to Step S114 (corresponding to Step S90 of FIG. 3).

In Steps S96 and S98, recording is conducted on the recording paper sheets. In this case, however, the recording is executed on one or more types of the recording paper sheets on which the data is recordable, instead of recording on the recording paper sheets of the designated size alone.

A description will now be given of a third embodiment of the present invention. In the first and second embodiments described above, when a communication requesting multi-output recording has been selected, only one set of output recording is performed if the number of the recording paper sheets remaining in the apparatus has come down below a predetermined value. In the third through fifth embodiments, which will be described below, when a communication requesting multi-output recording has been selected, only one set of output record is produced provided that each of the following conditions is met.

Namely, the third, fourth and fifth embodiments execute the production of a single set of output record when first, second and third conditions shown below are met, respectively.

The first condition is as follows. When the number of the remaining recording paper sheets has come down below a predetermined number, only one set of output record is produced even when the selected communication requests production of multiple sets of the output record, each set containing a predetermined number of recording sheets or greater, and image information is given to indicate this fact.

Figure 5:
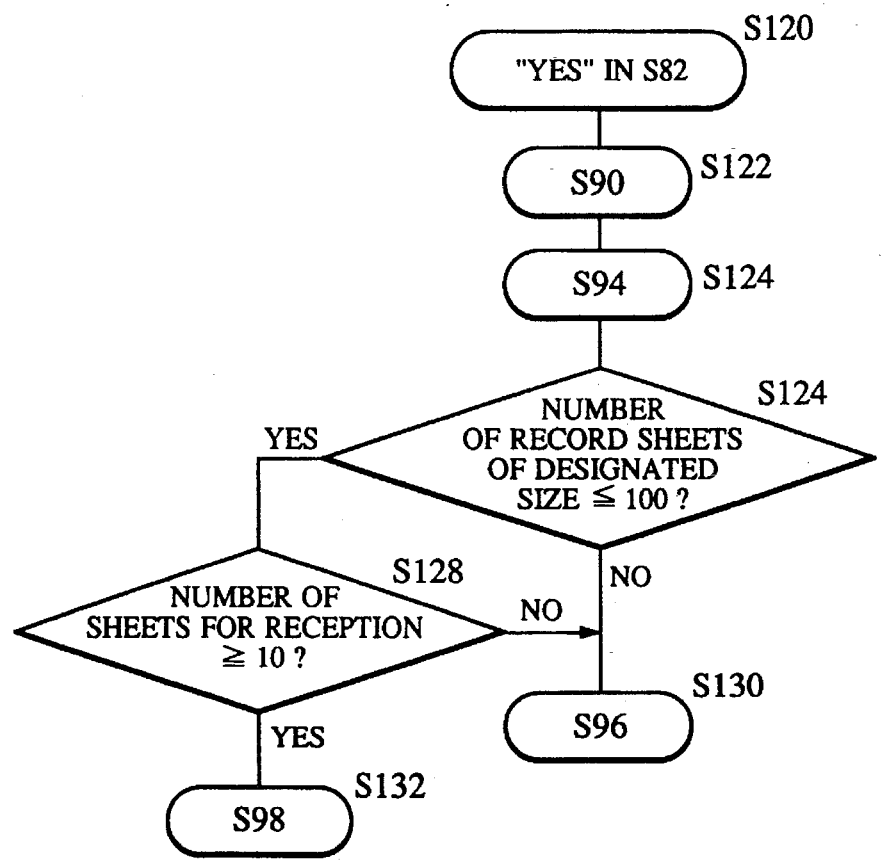
FIG. 5 is a flow chart illustrative of the operation of a third embodiment.

FIG. 5 is a flow chart illustrating a portion of the process of the third embodiment which discriminates the third embodiment from the process of the first embodiment.

S120 corresponds to the "YES" output of Step S82 of FIG. 2 describing the first embodiment described above. The process advances to Step S122 which corresponds to Step S90 of FIG. 3.

The process then proceeds to Step S124 which corresponds to the Step S94 of FIG. 3 described above, then to Step S126, where a determination is conducted as to whether the number of the recording paper sheets of the designated size remaining in the apparatus is not greater than 100 (as in Step S98 of the process of the first embodiment). If the number of the sheets of the designated size is 100 or less, the process proceeds to Step S128. If the number of the remaining sheets of the designated size exceeds 100, the process proceeds to Step S130 (corresponding to Step S96 of FIG. 3) which executes production of multiple sets of the output record.

In Step S128, a determination is conducted as to whether the volume of the data which has just been received is 10 or more in terms of the number of the recording paper sheets. If the volume of the received data is 10 or greater, the process proceeds to Step S132 (corresponding to Step S98 of FIG. 3) which executes production of only one set of the output record and provides image information indicative of this fact. If the volume of the data is less than 10, the process proceeds to Step S130 (corresponding to Step S96 of FIG. 3).

The fourth embodiment executes the production of the output record when the following second condition is met. The second condition is as follows. When the number of the remaining recording paper sheets has come down below a predetermined number, only one set of output record is produced even when the selected communication requests production of multiple sets of the output record, each set containing a predetermined number of recording sheets or greater, and image information is given to indicate this fact.

Figure 6:
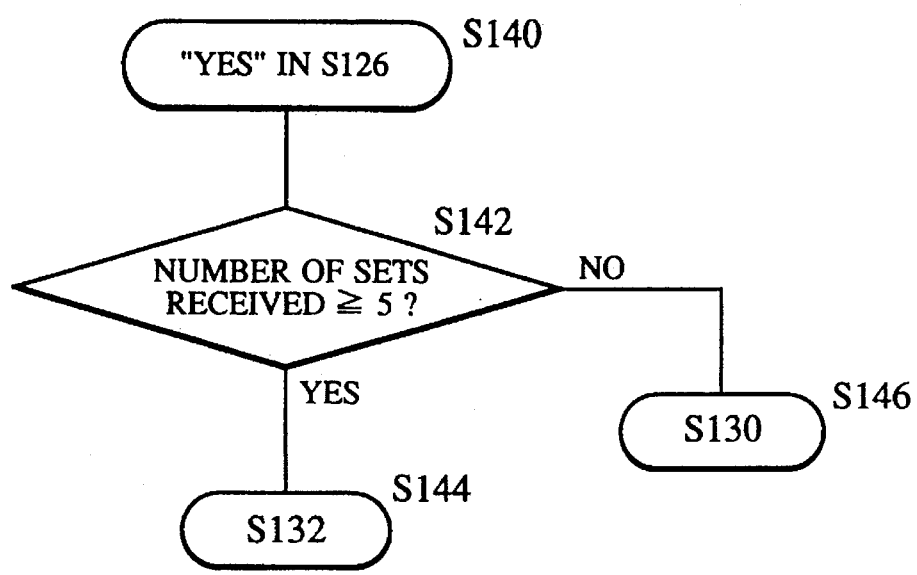
FIG. 6 is a flow chart illustrative of the operation of a fourth embodiment.

FIG. 6 is a flow chart illustrating a portion of the process of the fourth embodiment which discriminates the fourth embodiment from the process of the third embodiment. Step S140 corresponds to the "YES" output of Step 126 shown in FIG. 5. In Step S142, a determination is conducted as to whether the number of the sets of the record to be produced not less than 5 (five). If five or more sets of output record are to be produced, the process proceeds to Step S144 (corresponding to Step S132 of FIG. 5) in which only one set of output record is produced and image information indicating this fact is given. When the number of the sets of the output record requested is 5 or less, the process proceeds to Step S146 (corresponding to Step S130 of FIG. 5) in which the required number of sets of output record are produced.

A description will now be given of the fifth embodiment. The third condition, mentioned above, is as follows. When a communication requesting production of a plurality of sets of output record has been selected, where the number of the recording paper sheets remaining and available for the recording has come down below a predetermined number, a computation is executed to determine the product of the number of sheets to be contained in one set of the output record and the number of the sets to be produced. If the product value exceeds a predetermined number, only a single set of output record is produced and image information is given to indicate this fact.

Figure 7:
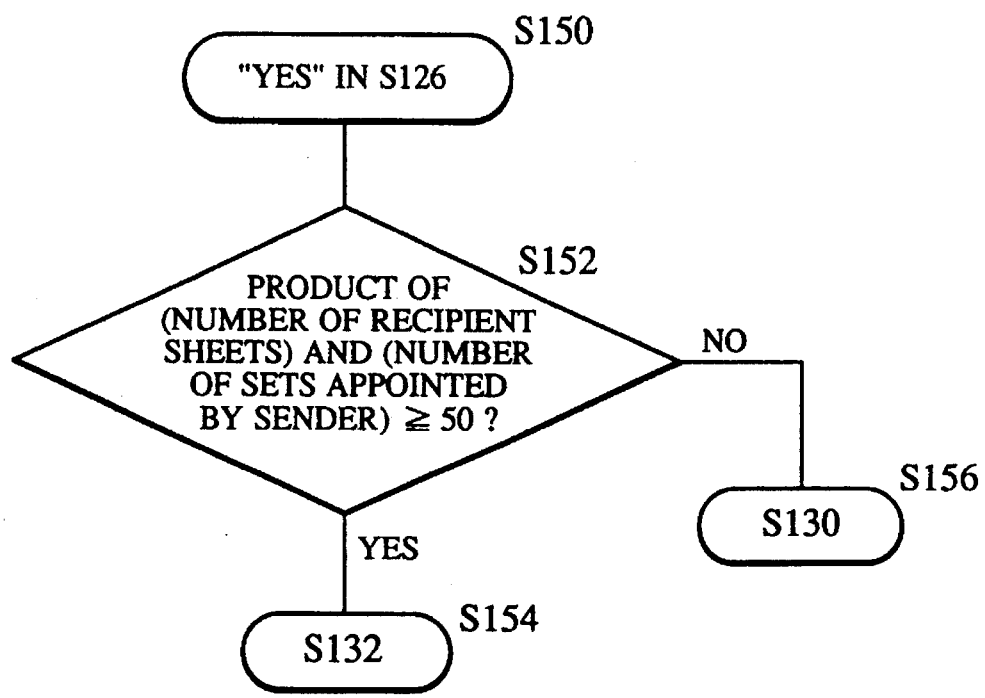
FIG. 7 is a flow chart illustrative of the operation of a fifth embodiment.

FIG. 7 is a flow chart illustrative of the portion of the process of the fifth embodiment which discriminates the fifth embodiment from the third embodiment.

Step S150 corresponds to the "YES" output of Step S126 in FIG. 5. In S152, a determination is made as to whether the product of the number of the sheets to be used for the recording of the data received and the number of sets of the output record to be produced. If the product is 50 or greater, the process proceeds to Step S154 (corresponding to Step S132 of FIG. 5) in which only one set of output record is produced and image information is given to indicate this fact. Conversely, if the product is less than 50, the multi-output recording is performed to produce the required number of sets of output record in Step S156 (corresponding to Step S130 of FIG. 5).

In the fifth embodiment, as described, when a communication requesting multi-output recording has been selected, "50" is used as the criterion for the determination as to whether only one set of output recording is to be produced, or, if all the requested number of sets of record are to be produced. In a sixth embodiment of the invention, the operation is basically the same as the fifth embodiment, except that the number of the remaining sheets available for the printing is used as the above-mentioned criterion. Namely, all the sets requested are printed in the event that there are recording sheets remaining and available for producing all the sets of output record requested.

In the embodiments described above, the condition for switching the mode to the mode for executing production of only one set of output record is not changed based on the number of the sheets remaining in the facsimile apparatus. The invention, however, may be carried out such that the condition for allowing the multi-output printing is changed based on the number of the remaining sheets, as in the seventh, eighth and ninth embodiments which will now be described.

The seventh, eighth and ninth embodiments rely upon the following first, second and third conditions, respectively. According to the first condition, the number of the sheets contained in one set of output record, allowed for multi-output printing, is varied in accordance with the number of the recording sheets remaining in the facsimile apparatus. For instance, the multi-output recording is permitted when the volume of the recorded data, in terms of the number of sheets to be used for recording per set, is less than 5% of the number of the sheets remaining in the facsimile apparatus.

Figure 8:
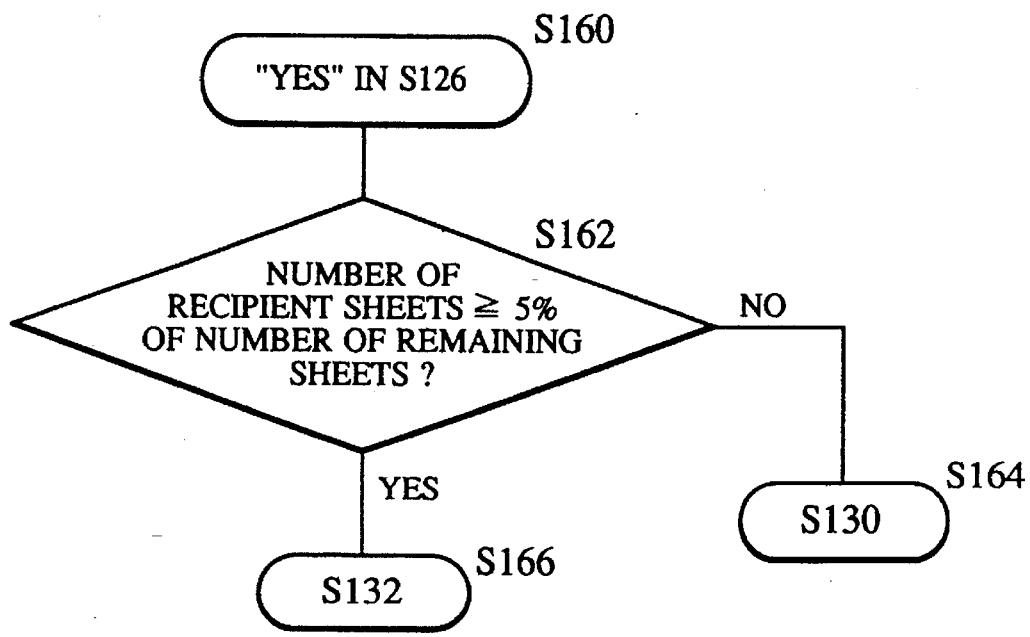
FIG. 8 is a flow chart illustrative of the operation of a seventh embodiment.

FIG. 8 is a flow chart showing a portion of the process of the seventh embodiment which distinguishes the seventh embodiment from the third embodiment described before.

Step S160 corresponds to the "YES" output of Step S126 shown in FIG. 5. In Step S162, a determination is made as to whether the volume of the recorded data, in terms of the number of sheets to be used for recording per set, is more than 5% the number of the sheets remaining in the facsimile apparatus. If the volume of the received data is 5% or more than the number of the remaining sheets, the process proceeds to Step S166 (corresponding to Step S132 of FIG. 5) in which only one set of the output record is produced. If the volume of the received data is less than 5% the number of the remaining sheets, Step S164 (corresponding to Step S130 of FIG. 5) is executed to produce the requested number of sets of the output record.

The eighth embodiment relies upon the second condition in which the number of sets of the output record permitted to be produced is changed based on the number of the sheets remaining in the facsimile apparatus and available for printing. For instance, the requested number of sets of the output recording are produced when the number of the sets of output record requested amounts to less than 3% of the number of the recording paper sheets remaining in the facsimile apparatus.

Figure 9:
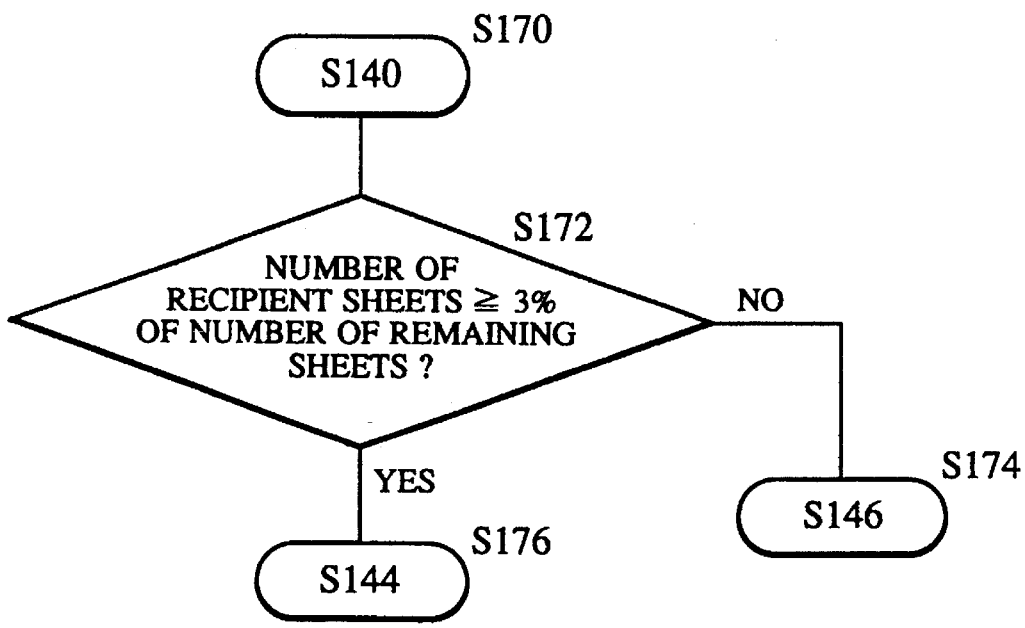
FIG. 9 is a flow chart illustrative of the operation of an eighth embodiment.

FIG. 9 is a flow chart illustrative of a portion of the process of the eighth embodiment which distinguishes the eighth embodiment from the fourth embodiment.

Referring to FIG. 9, Step S170 corresponds to Step S140 shown in FIG. 6. In Step S172, a determination is conducted as to whether the requested number of sets to be produced amounts to less than 3% of the number of the sheets remaining and available in the facsimile apparatus. If the answer is "YES", i.e., the number of requested sets to be produced amounts to 3% or more of the number of sheets remaining, the process proceeds to Step S176 (corresponding to Step S144 of FIG. 4) which produces only one set of output record, together with image information indicative of this fact. If the answer in Step S172 is "NO", the process proceeds to Step S174 (corresponding to Step S164 of FIG. 8) which produces plural sets of the output record.

The ninth embodiment relies upon the third condition in which the value of the product of the number of sheets contained in each set of the record allowed for multi-output recording, and the number of sets of the output record to be produced, varies depending on the number of sheets remaining in the facsimile apparatus. For instance, the requested multi-output recording is permitted when the product of the number of the sheets contained in the record and the number of sets of the output record to be produced is below 10% the number of the sheets remaining in the facsimile apparatus.

Figure 10:
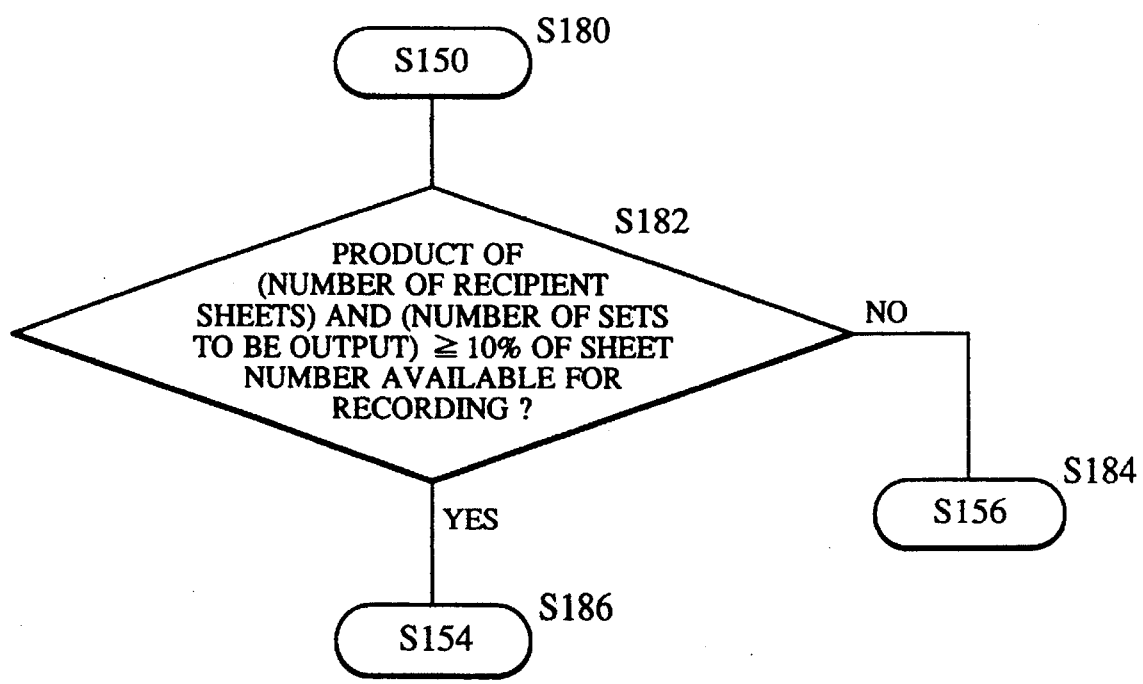
FIG. 10 is a flow chart illustrative of the operation of a ninth embodiment.

FIG. 10 shows a portion of the process of the ninth embodiment which distinguishes this embodiment from the fifth embodiment described above.

Referring to FIG. 10, Step S180 corresponds to Step S150 of the flow shown in FIG. 7. Step S182 determines whether or not the product of the number of sheets to be consumed for printing one set of the received data and the number of sets requested to be produced is not less than 10% of the number of the sheets remaining and available for recording in the facsimile apparatus. If the answer in Step S182 is "YES", the process advances to Step S186 (corresponding to Step S154 of FIG. 7) together with the information indicative of this fact. If the answer in Step S182 is "NO", Step S184 (corresponding to Step S156 of FIG. 7) is executed to produce the requested number of sets of the output record.

A tenth embodiment of the present invention will now be described.

In the tenth embodiment, when multi-output recording is not permitted for failure to meet each of the conditions described above, regardless of whether a communication bound for multi-output recording has been selected, the received picture data is received in a memory circuit and an indication is made so as to indicate that the received data has been stored, instead of execution of the output printing. The requested number of sets of the output record of the stored picture data are produced when an instruction is given to output the stored data.

It is assumed here that the number of the sheets of the designated size remaining in the facsimile apparatus has become below a predetermined number, e.g., 100, as in the case of the first embodiment described earlier.

Figure 11:
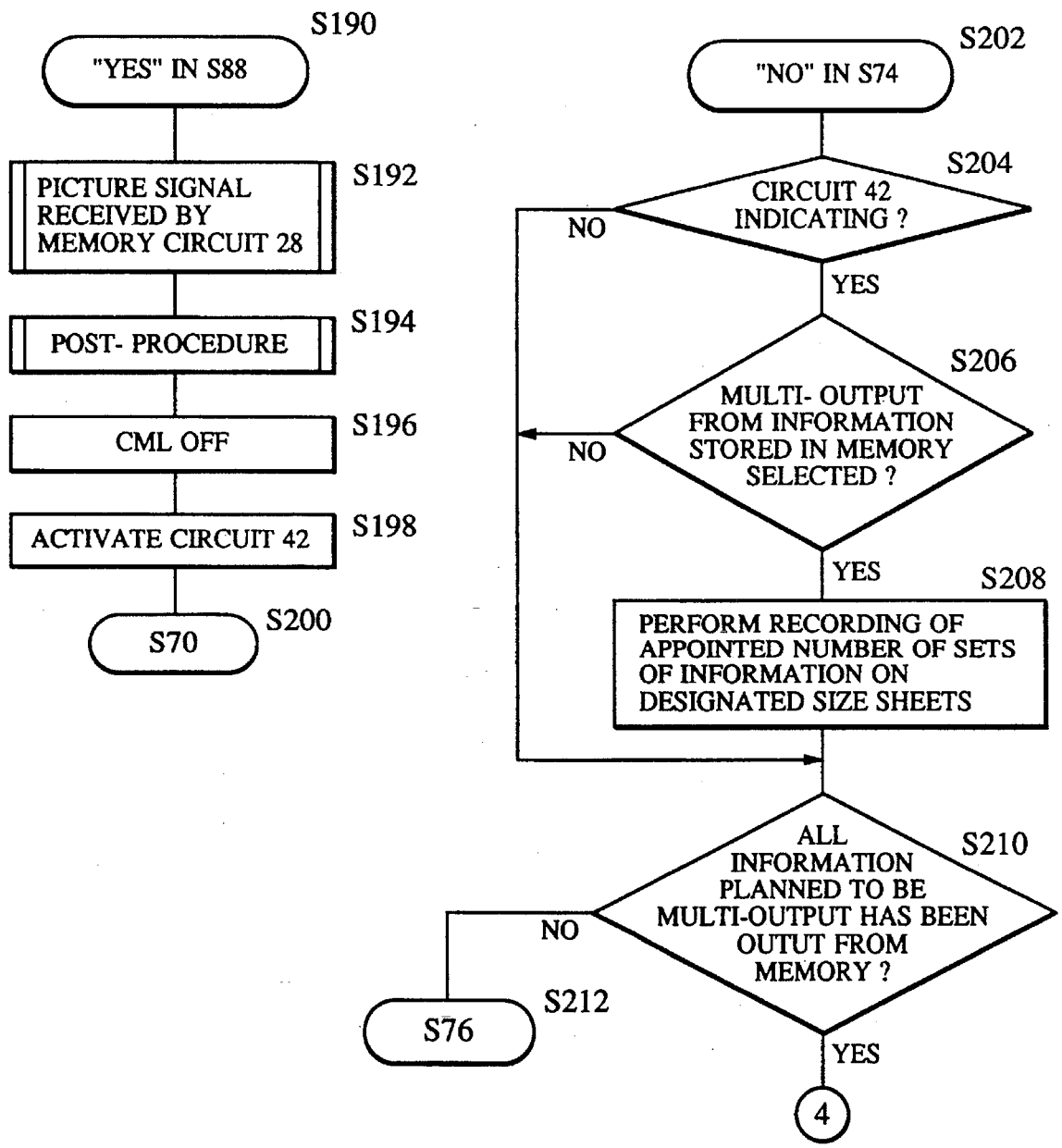
FIG. 11 is a flow chart illustrative of the operation of a tenth embodiment.
Figure 12:
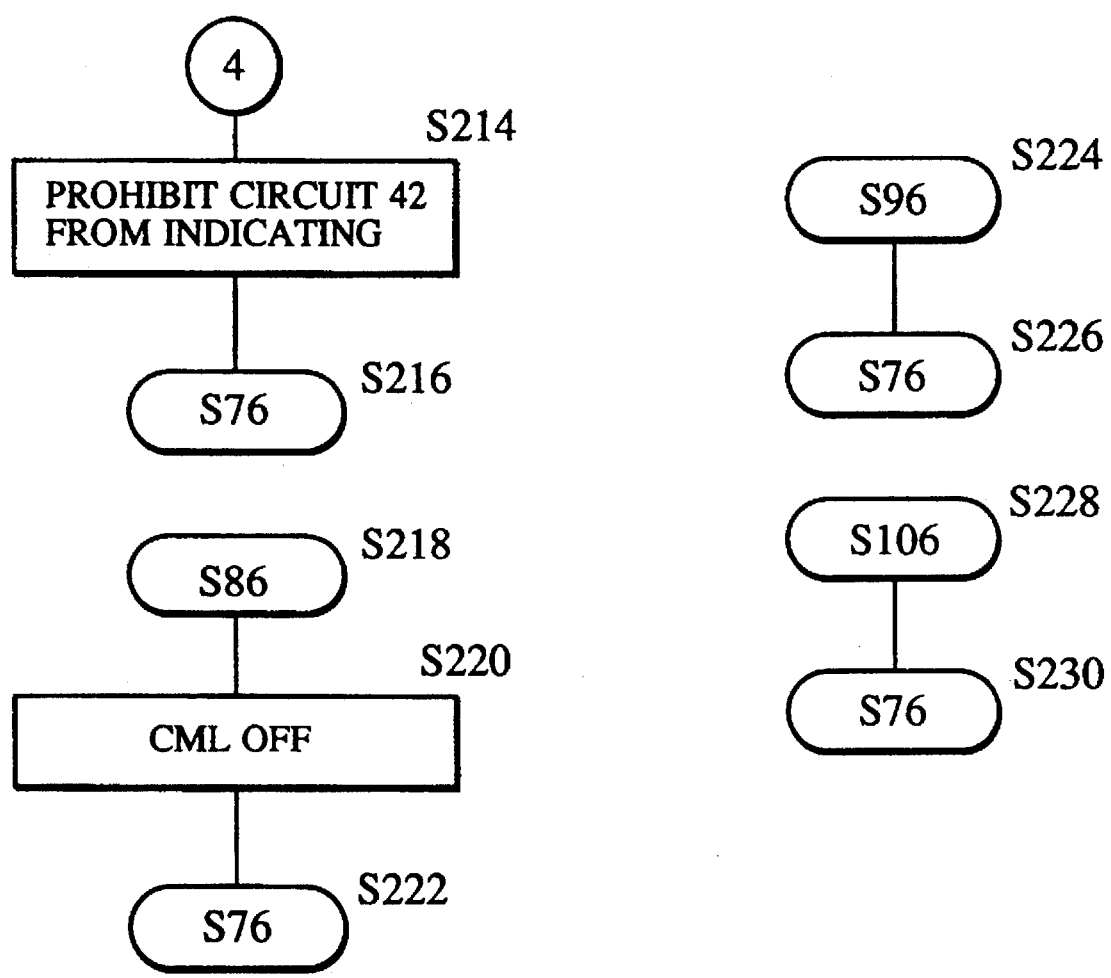
FIG. 12 is another flow chart illustrative of the operation of the tenth embodiment.

FIGS. 11 and 12 are flow charts illustrative of the process of the tenth embodiment which distinguishes this embodiment from the first embodiment described earlier.

Step S190 corresponds to the "YES" output of Step S88 of FIG. 3 of the flow of the first embodiment. As in the case of Step S90 described above, Step S192 indicates storage of the picture signals in the memory circuit 128. Step S194 executes post-procedure and Step S196 delivers a signal level "0" to the signal line 52a, so as to turn off the CML.

In Step S198, a signal of "1" level is supplied to the signal line 52i to indicate that data bound for multi-output recording has been stored in the memory circuit. A Step which is the same as Step S70 is then executed at Step S200.

Step S202 corresponds to "NO" output of Step S74 described above. Step S204 determines whether or not the indicator circuit 42 is indicating the formation. If the indicator circuit 42 is in operation, the process proceeds to Step S206, whereas, if not, the process advances to Step S210.

In Step S206, it is determined whether or not the operation for multi-output recording of the data stored in the memory circuit 28 has been selected, based on information derived from signal lines 46a, 48a and 50a. If the multi-output recording has been selected, the process proceeds to Step S208, if not, the process skips to Step S210.

Step S208 executes production of a plurality of sets of output record in accordance with the number of sets and the sheet size appointed through the signal line 52e.

Step S210 determines whether or not all the data bound for multi-output recording has been output from the memory circuit 28. When all such data has been output, the process proceeds to Step S214, shown in FIG. 12, whereas, if not, the process proceeds to Step S212 (corresponding to Step S76 shown in FIG. 3).

In S214, a signal of "0" level is supplied to the signal line 52i, so as to prohibit the indicating circuit 42 from indicating that data bound for multi-output recording is stored in the memory circuit 28. The process then proceeds Step S216 which executes the same operation described with respect to Step S76 above.

Step S218 corresponds to Step S86 of FIG. 2 described above. In Step S220, a signal of "0" level is supplied to the signal line 52a to turn CML off. The process then proceeds to Step S222 which again advances to the process described in Step S76 above.

Step S224 corresponds to Step S96 described above. At Step S226, the process again advances to the above-described Step S76. Step S228 corresponds to Step S106 described above with respect to FIG. 3. The process then advances to the above-described Step S76 at Step S230.

In the tenth embodiment, as described above, storage of the received data in the memory circuit 28 is conducted on the condition that the number of the sheets of the designated size remaining in the facsimile apparatus is not greater than a predetermined number, e.g., 100 or less. However, a single set of output record may be produced from the data stored in the memory circuit, as in the eleventh embodiment of the invention, in accordance with one of conditions described above in connection with the second through ninth embodiments.

In the first to eleventh embodiments described above, the multi-output recording is performed for the data received from a remote station. The invention, however, can be applied to production of multiple copies of an image, as in a twelfth embodiment of the invention.

A description will now be given of the case in which the operation described in connection with the tenth embodiment is applied to a multi-copy operation.

Figure 13:
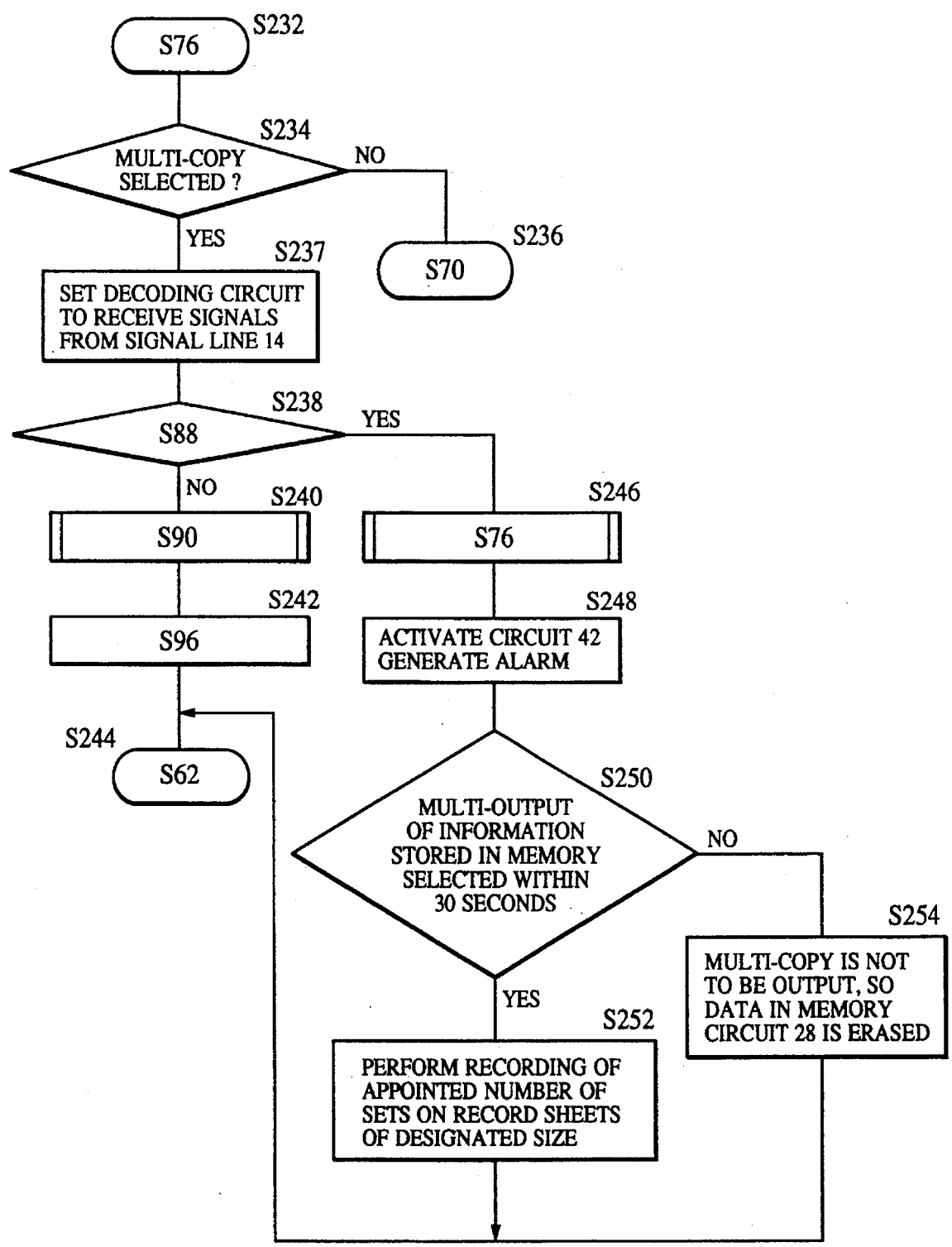
FIG. 13 is a flow chart illustrative of the operation of a twelfth embodiment.

FIG. 13 is a flow chart of a process performed in the eleventh embodiment, particularly the portion of the operation which distinguishes the eleventh embodiment from the first embodiment described before.

Step S232 executes the same operation as that performed in Step S76 of FIG. 2. In Step S234, whether or not the multi-copy mode has been selected is determined. If this mode has been selected, the process advances to Step S237. If not, the process advances to Step S236 (corresponding to Step S70 of FIG. 2).

In Step S237, a signal of level "1" is delivered to the signal line 52f so as to enable the decoding circuit 30 to receive the signal which has been delivered to the signal line 14a. In Step S238, a determination is conducted as to whether the number of the sheets of the designated size remaining in the facsimile apparatus is 100 or less, as in Step S88 described above. When the number of the sheets remaining is less than or equal to 100, the process proceeds to Step S246, whereas, when the number of remaining sheets is greater than 100, the process advances to Step S240.

In Step S240, picture signals are stored in the memory circuit 28, as in Step S90 describe before, and, in Step S242, the recording operation is executed to produce the designated number of sets of output record on recording paper sheets of the designated size. The process then advances to Step S244 (corresponding to Step S62 of FIG. 2).

Step S246 stores the picture signals in the memory circuit 28, as in Step S90 described before. In Step S248, a signal of level "1" is delivered to the signal line 52i so that information is displayed to indicate that data bound for multi-output recording has been stored in the memory circuit and, at the same time, an alarm sound is generated.

In Step S250, a determination is made as to whether multi-output of information stored in the memory circuit 28 has ben selected within 30 seconds. If a selection has been made within 30 seconds, the process proceeds to Step S252 in which an operation is executed to produce the designated number of sets of output record on the recording paper sheets of the designated size.

Conversely, when the selection has not been made within 30 seconds, the process advances to Step S254, where, since multi-copy is not output, data stored in the memory circuit 28 is erased therefrom.

A description will now be given of a thirteenth embodiment of the present invention.

In known facsimile apparatuses having a multi-output function for producing a plurality of sets of output record, whether the multi-output recording is to be performed is decided by the receiving station itself, or, multi-output recording is executed unconditionally whenever data is received from a specific sending station or stations bound for multi-output recording. The multi-output recording also can be performed in response to a request from the sending station.

When the multi-output recording is performed by the decision made by the facsimile apparatus of the receiving station itself, a problem may occur where the multi-output recording is inconveniently performed even when the received data need not be printed in plural. Alternatively, for realizing such a system that the facsimile apparatus selectively performs the multi-output operation in accordance with instruction given from the facsimile apparatus of the sending station, it is necessary to modify the sending facsimile apparatus in such a manner so as to enable the facsimile apparatus to produce such an instruction.

In the embodiments which will be described below, a facsimile apparatus capable of performing multi-output recording is provided with character recognition means, which recognizes character information which is carried by the data transmitted from the sending station, and, which indicates addressees to which the received information is to be directed. The facsimile apparatus then produces a plurality of sets of output record by a number which is the same as the number of the recognized addressees. Each output record thus obtained carries unique information for each addressee designated by the character information.

Figure 14:
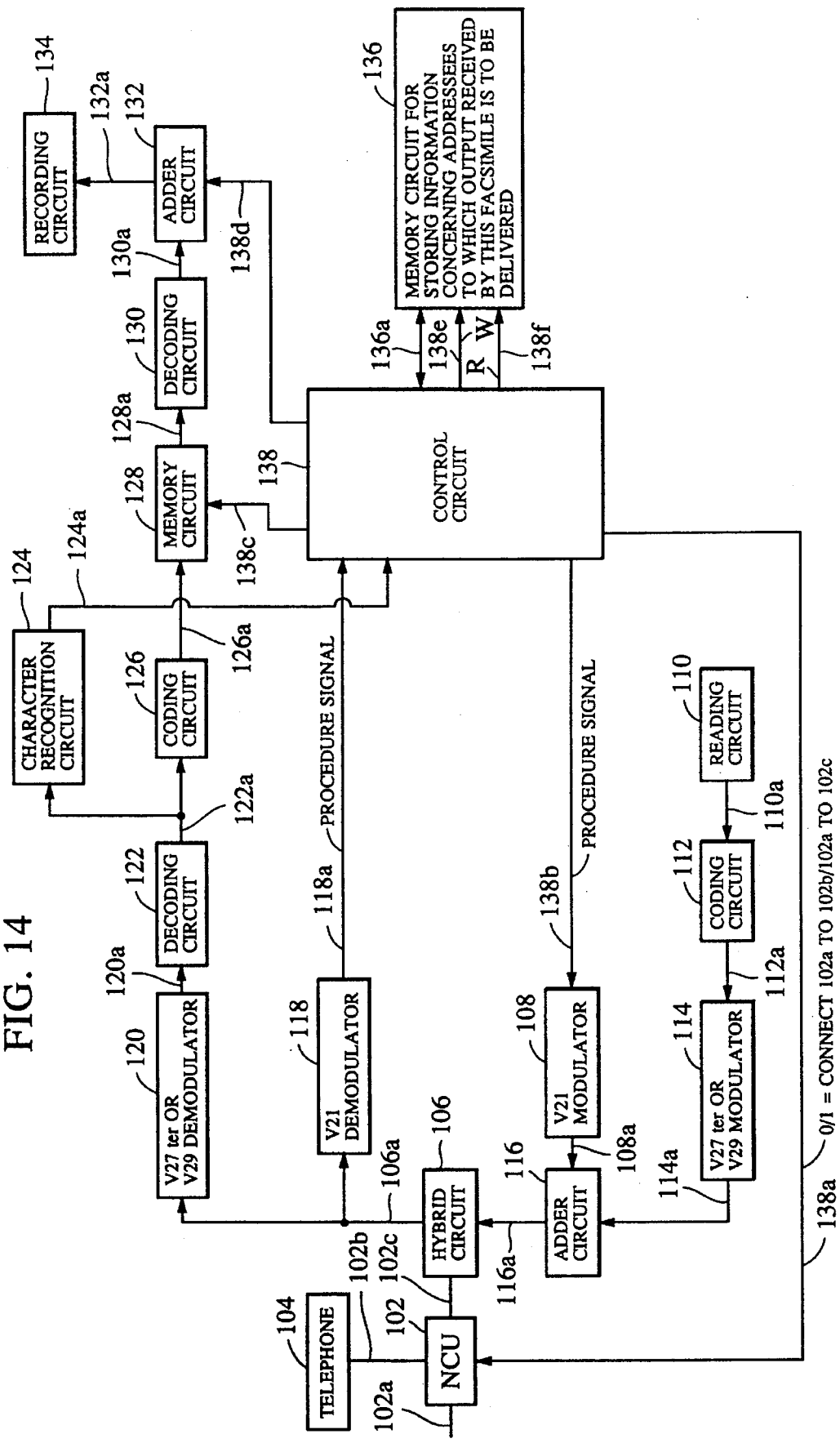
FIG. 14 is a flow chart illustrative of the operation of a thirteenth embodiment.

FIG. 14 is a block diagram illustrative of the construction of the thirteenth embodiment of the present invention.

Referring to FIG. 14, a network control unit 102, (referred to also as NCU 102, hereinafter), is connected to an end of a telephone communication line so as to make it possible to use a telephone network for the purpose of data communication, and performs various controls such as control of connection to the telephone exchange network, switching to a data transmission line, holding of a loop, and so forth. When the level of a signal on a signal line 132a, from a control circuit 138, is "0", the NCU 102 operates to connect the telephone circuit 102a to a telephone 104, whereas, when the signal level is "1", the NCU 102 operates to connect the telephone circuit 102a to a facsimile apparatus. Usually, the telephone circuit 102a is connected to the telephone 104.

A hybrid circuit 106 separates a signal on a transmission system and a signal on a receiving system from each other. The hybrid circuit 6 operates to deliver a transmission signal from an adder circuit 116 to the telephone circuit 102a via the NCU 102, and also to receive a signal from an opposite station via the NCU 102 so as to deliver the received signal to a V29 demodulator 120, and a V21 demodulator 118, through a signal line 106a.

A V21 modulator 108 performs modulation in accordance with CCITT recommendation V21, which is well known. More specifically, it modulates a procedure signal on a signal line 138b from the control circuit 138 and delivers the modulated signal to the adder circuit 116 through a signal line 108a.

A reading circuit 110 reads, from a transmitted original, main-scan line picture signals for successive lines of main scan in a line-by-line fashion, and forms trains of binary signals, each having eighth white or black level, so as to form serial data. The reading circuit 110 then sends the read data to a coding circuit 112 through a signal line 110a. The reading circuit 110 comprises an imaging device such as CCD (charge-coupled device) and an optical system.

The coding circuit 112 receives read data supplied through the signal line 110a and performs coding of the data, specifically MH coding or MR coding, and delivers the result of coding through the signal line 112a.

A V27ter or V29 modulator 114 receives coded data from the signal line 112a and performs modulation in accordance with V27ter (phase difference modulation) or V29 (orthogonal modulation) of CCITT recommendation, which is known, and delivers the modulated data to the adder circuit 116 through a signal line 114a.

The adder circuit 116 is a circuit which adds the outputs from the modulators 108 and 114. The output of adder circuit 116 is delivered to the hybrid circuit 106.

A V21 demodulator 118 performs demodulation in accordance with CCITT recommendation V21 which is known. The demodulator 118 receives a procedure signal from the hybrid circuit 106 via a signal line 106a, performs the V21 demodulation and delivers the resultant demodulated data to the control circuit 138 through a signal line 118a.

A demodulator 120, which is a V27ter or V29 demodulator, performs demodulation in accordance with V27ter or V29 of CCITT recommendation which is known. The demodulator 120 receives modulated picture signals from the hybrid circuit 106, demodulates these picture signals and then delivers the resultant demodulated data to a decoding circuit 122 through a signal line 120a.

The decoding circuit 122 is a circuit which performs decoding, specifically MH decoding or MR decoding, of the data received through the signal line 120a, and delivers the decoded data to a character recognition circuit 124, and a coding circuit 126, via a signal line 122a.

The character recognition circuit 124 receives raw data from the signal line 122a, performs character recognition, and delivers the recognized character data to the control circuit 138 through a signal line 124a.

The coding circuit 126 receives raw information from the signal line 122a, performs MR coding of the information with k=8, and delivers the coded data to a memory circuit 128 through a signal line 126a.

The memory circuit 128 operates under the control of the control circuit 138, via a signal line 138a, so as to store the data which is available on the signal line 126a, and to deliver the stored data to a decoding circuit 130 via a signal line 128a.

The decoding circuit 130 is a circuit which performs decoding (MR decoding with k=8) of the data received through the signal line 128a, and delivers the decoded data to an adder circuit 132 through a signal line 130a.

The adder circuit 132 receives data from the signal lines 130a and 138d and determines the sum of these data. The result of the addition is delivered to a recording circuit 134 via a signal line 132a.

The recording circuit 134 receives data available on the signal line 132a and performs the recording (printing) of the data in a line-by-line fashion, although the recording may also be done in a page-by-page fashion.

A memory circuit 136 stores addressee information concerning the addressees for which the output records are to be produced by this facsimile apparatus, from among the addressee information contained in the received data and recognized by the character recognition circuit 124. The memory circuit 136 can store, for example, up to 100 kinds of addressee information, from 00 to 99.

The storage of the addressee information in the memory circuit 136 can be conducted as follows. The user first enters through the signal line 136a, a code, e.g., 00, then enters a space and finally enters the addressee information to be output by the receiving facsimile apparatus, e.g., SHIMO-MARUKO TOKYO, followed by generation of a write pulse in the signal line 138*e*. Reading of the information stored in the memory circuit 136 is possible by entering the code number, e.g., 00, to the signal line 136*a*, followed by generation of a read pulse on the signal line 138*f*. In response to the read pulse, the addressee information corresponding to the code number, e.g., SHIMOMARUKO, is delivered to the signal line 136*a*.

The control circuit 138 performs character recognition of the addressee or addressees designated by character information from the sending facsimile apparatus, and performs printing of the received image data by a number corresponding to the number of the designated addressees. When successive sets of output record are produced for the successive addressees designated by the character information, unique information is given, sequentially, to each of these successive sets of output record.

Figure 15:
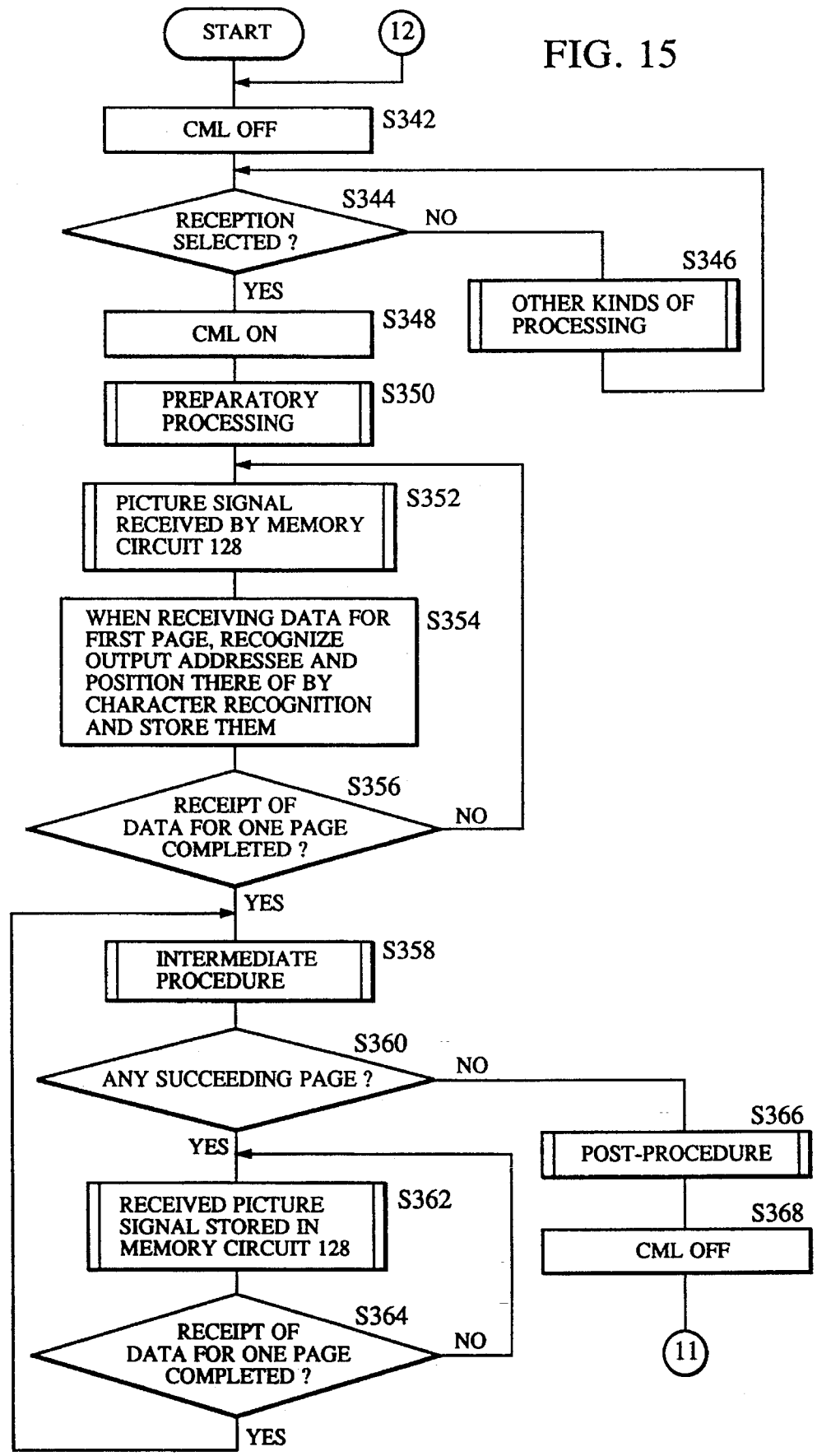
FIG. 15 is another flow chart illustrative of the operation of the thirteenth embodiment.
Figure 16:
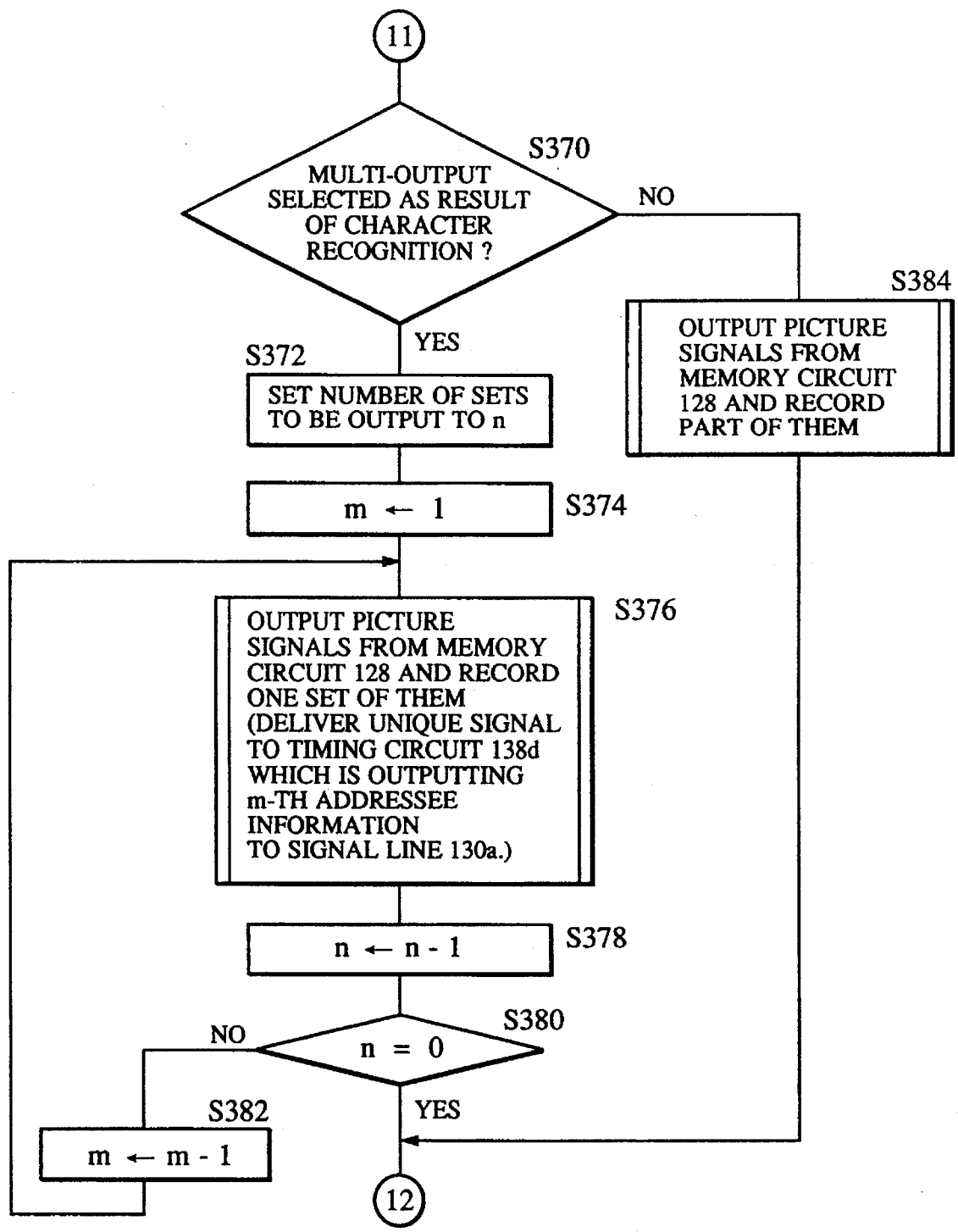
FIG. 16 is still another flow chart illustrative of the operation of the thirteenth embodiment.

FIGS. 15 and 16 are flow chats illustrative of the operation of the thirteenth embodiment.

In Step S342 of FIG. 13, a signal of level "1" is delivered to the signal line 138*a* so as to turn off the CML. In S344, a determination is made as to whether the reception has been selected. If the reception has been selected, the process advances to Step S348, whereas, if not, the process skips to Step S346 wherein other kinds of processing are performed.

In Step S348, a signal of level "1" is supplied to the signal line 138*a* so as to turn the CML on. After execution of a preparatory procedure in Step S350, Step 352 is executed to receive picture signals from the signal line 138*c* and to store the same in the memory circuit 128.

In the case of reception of the data for the first page, in Step S354, information available on the signal line 124*a*, from the character recognition circuit 124, is received, so that the addressees and the positions are recognized through character recognition and then stored.

In Step S356, it is determined whether or not the receipt of one page data has been completed. When data for one page has ben received, the process advances to Step S358, whereas, if not, the process returns to Step S352.

Step S358 executes an intermediate procedure. In Step S360, it is determined whether or not any subsequent page exists. If there is a subsequent page, the process advances to Step S362, whereas, when there is no subsequent page, the process skips to Step S366.

In Step S362, picture signals received through the signal line 138*c* are stored in the memory circuit 128. In Step S364, a determination is made as to whether receipt of data for one page has been completed. When one-page data has been received, the process returns to Step S358, whereas, if not, the process advances to Step S362.

Step S366 executes a post-procedure. In Step S368, a signal of level "0" is output to the signal line 138*a* so as to turn the CML off.

In Step S370 of FIG. 14, a determination is made as to whether a plurality of sets of output record are to be produced, based on the result of character information carried by the data of the first page. When a plurality of sets of output have to be produced, the process advances to Step S372, whereas, if not, the process advances to Step S384.

Step S372 stores the number of the sets of output record to be produced in a counter "n". In a subsequent step S374, "1" is set on a counter "m". In Step S376, picture signals are output from the memory circuit 128 via the signal line 138*c* and are then stored. In this operation, at the same timing as the delivery of the "m-th" addressee information to the signal line 130*a*, a unique signal is supplied to the signal line 138*d* to indicate that the addressee information which is being delivered is the information pertaining to the "m-th" addressee.

In Step S378, the content of the counter "n" is decremented by "1" and, in Step S380, a determination is conducted as to whether the content of this counter is "0" or not. The counter content "0" means that all the information has been output. In such a case, the process skips to Step S342. If not, the process advances to Step S382.

In Step S382, the content of the counter "m" is incremented by "1", and the process returns to Step S376, so that the recording operation is repeated until the output records are produced for all the addressees.

In Step S384, picture signals are output from the memory circuit 128 through the signal line 138*c*, and one set of the output record is produced based on the picture signals. The process then returns to Step S342.

FIG. 17 is an illustration of an example of the picture information to be sent from the facsimile apparatus of the sending station.

It will be seen that the destination is "Facsimile Developing Department" and the received data is to be delivered to four addresses, Mr. Yoshida, Mr. Ishida, Mr. Toda and Mr. Shinada.

The facsimile apparatus of the receiving station receives the picture information sent from the sending station and stores the same in its memory. The fact that there are four addressees is recognized through character recognition. In this case, therefore, the facsimile apparatus produces four sets of output record.

FIGS. 18(1) and 18(2) illustrate examples of two sets of picture information out of the four sets of the image information received and printed at the receiving station. It will be seen that FIG. 18(1) has a framework surrounding the addressee Mr. Yoshida, indicating that this set of the output picture information is to be delivered to Mr. Yoshida. Similarly, FIG. 18(2) has a framework surrounding the addressee Mr. Ishida, suggesting that this set of output record is to be delivered to Mr. Ishida. Similarly, frameworks are given for Mr. Toda and Mr. Ishida in the third and fourth sets of the output information, although they are not shown.

A description will now be given of a fourteenth embodiment of the present invention.

In the thirteenth embodiment, the recording operation is conducted only after completion of storage of the received data in the memory, even when only one set of the output record is to be produced. In the fourteenth embodiment, in contrast, the recording of received data may be commenced without delay after the receipt, when it is determined that only one set of output is requested, i.e., when there is only one addressee.

Figure 19:
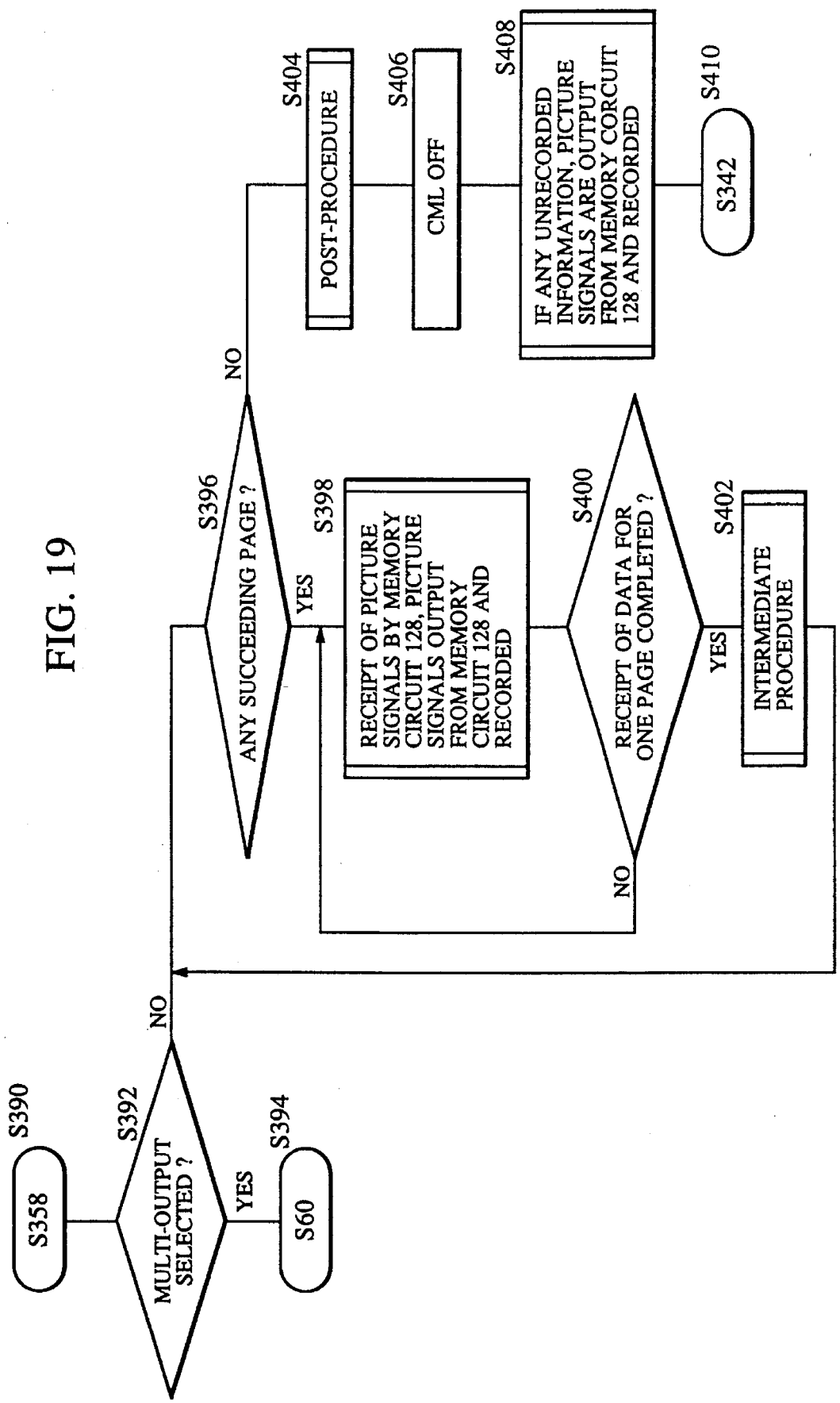
FIG. 19 is a flow chart illustrative of the operation of a fourteenth embodiment.

FIG. 19 is a flow chart illustrative of the portion of the process performed in the fourteenth embodiment which distinguishes the fourteenth embodiment from the thirteenth embodiment.

In FIG. 19, Step S390 corresponds to Step S358 of FIG. 16. In Step S392, whether or not the mode for multi-output recording has been selected is determined based on the character recognition. When the multi-output recording has been selected, the process skips to Step S394 (corresponding to Step S360 of FIG. 15), whereas, if not, the process advances to Step S396.

Step S396 determines whether or not any subsequent page exists. If there is a subsequent page, the process advances to Step S398, whereas, if not, the process advances to Step S404.

In Step S398, operations are performed for enabling the memory circuit 128 to receive picture signals through the signal line 138c and for recording picture signals read from the memory circuit 128. Step S400 determines whether or not the receipt of data for one page has been completed. If the receipt of one page data has been finished, the process advances to Step S402, whereas, if not, the process returns to Step S398.

After execution of the intermediate procedure in Step S402, the process returns to Step S396 for the processing of the data of the next page.

Step S404 executes the post-procedure, followed by Step S406 which delivers a signal of level "0" to the signal line 38a, so as to turn the CML off. Step S408, when there is any data which has not been recorded yet, reads such data from the memory circuit 128 through the signal line 138c and records such data. The process then advances to Step S410, which corresponds to Step S342 of FIG. 15.

In the thirteenth embodiment, frameworks surrounding the addressees are used as the unique information identifying the addressees. This, however, is only illustrative and the unique information may be provided in the form of halftone image as in a fifteenth embodiment.

In the thirteenth embodiment, one set of output record is produced for each of the addressees recognized through character recognition. The invention, however, may be carried out such that a plurality of destinations are registered and a plurality of sets of output record are produced for reach of such destinations, as in a sixteenth embodiment of the present invention which will now be described.

The sixteenth embodiment of the present invention provides a facsimile apparatus having a function for producing a plurality of sets of record of the received data, the facsimile apparatus comprising character recognition means and means for storing the addressees for which the received data are to be recorded by this facsimile apparatus. In operation, the facsimile apparatus performs character recognition to recognize the addressee information contained in the character data sent from the facsimile apparatus of the sending station, and selects the addressees for whom the output records are to be produced by this receiving facsimile apparatus out of all the addressees of the addressee information contained by the received data. The facsimile apparatus then produces a plurality of sets of output record for the addressees to whom the received data are to be delivered by this facsimile apparatus.

The destination may be registered in the form of the same of a district, the name of a group, section, department or the like, or in terms of the individual name.

In the sixteenth embodiment, the destinations are registered in the form of the district names, whereas, in a seventeenth and eighteenth embodiments which will be described later, the destinations are registered in the form of names of departments of a company or the like and in the form of individual names, respectively.

The description will begin with the description of the sixteenth embodiment in which the destination is recognized based on the district name.

Figure 20:
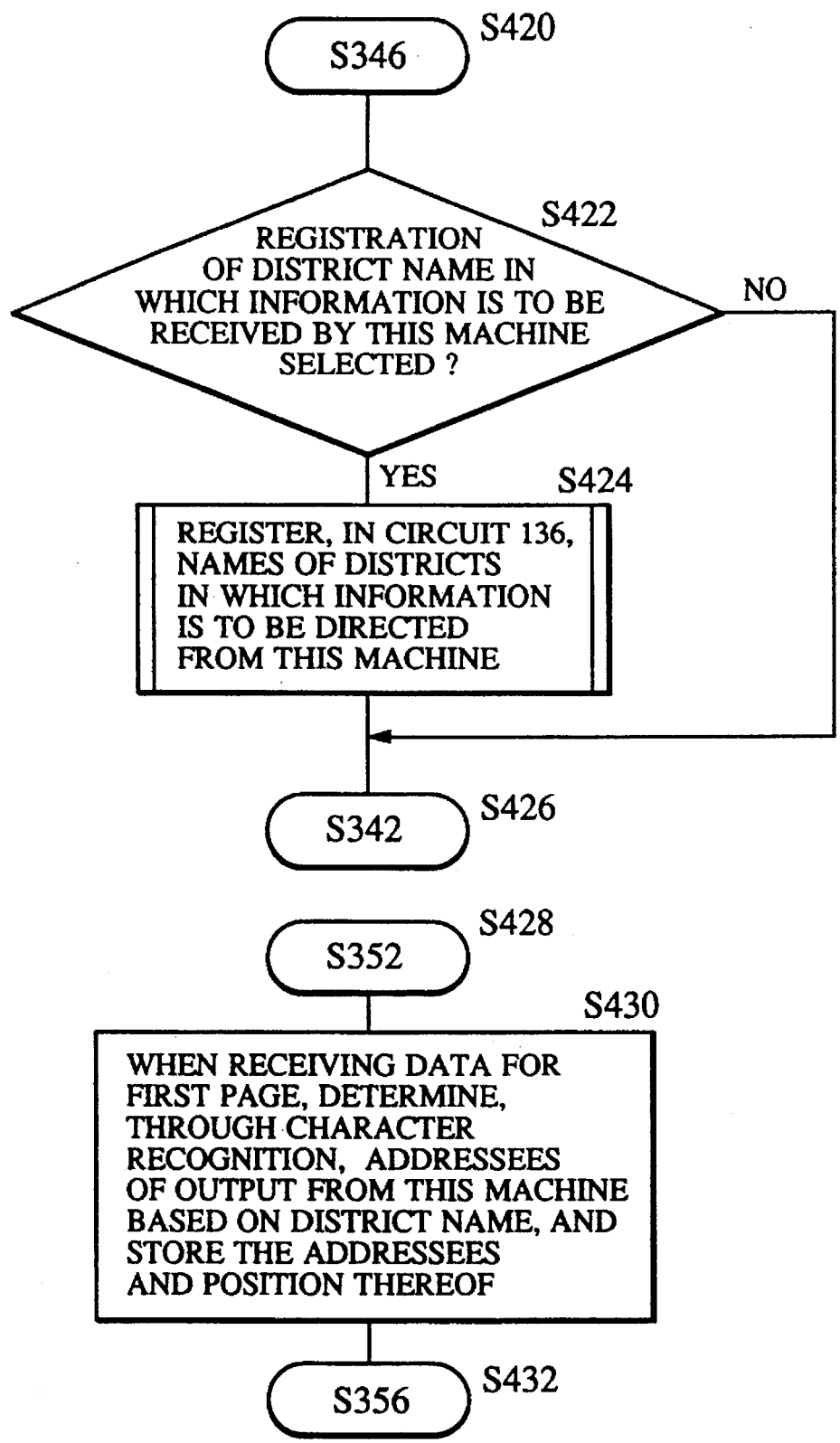
FIG. 20 is a flow chart illustrative of the operation of a sixteenth embodiment.

FIG. 20 is a flow chart illustrative of a portion of the process executed in the sixteenth embodiment which distinguishes the sixteenth embodiment from the thirteenth embodiment described earlier.

Referring to FIG. 20, Step S420 corresponds to Step S346 of FIG. 16 of the process performed in the thirteenth embodiment. In Step S422, a determination is made as to whether registration of the district name as the destination name to be used for this facsimile apparatus has been selected. If the registration has been selected, the process proceeds to Step S424, whereas, if not, the process proceeds to Step S426.

In Step S424, the district name, as the destination name to be used on this facsimile apparatus, is registered in the memory circuit 136. For instance, SHIMOMARUKO is registered as the district name. Then, the process advances to Step S426, corresponding to Steps S342 of FIG. 15 described before.

Step S428 then corresponds to Step S352 of FIG. 15 described above. In Step S430, when receiving the data for the first page, the facsimile apparatus recognizes the addressees for whom the received data are to be printed by this apparatus, based on the district name, and stores the addressees and the positions of the indication of the addressees. The process then proceeds to Step S432 which corresponds to Step S356 described above.

FIG. 21 illustrates an example of the picture information to be sent from the facsimile apparatus of the sending station.

Referring to FIG. 21, there are three destinations: SHINJUKU, SHIMOMARUKO and AMI. Addressees are Mr. Yoshida and Mr. Ishida at SHINJUKU, Mr. Toda and Mr. Shinada at SHIMOMARUKO and Mr. Eda and Mr. Wada at AMI.

A description will now be given of the reception of the data by the facsimile apparatus as SHIMOMARUKO. The facsimile apparatus receives the data transmitted from the facsimile apparatus of the sender. The facsimile apparatus at SHIMOMARUKO then recognizes that the addressees for whom this facsimile apparatus is required to perform recording are Mr. Toda and Mr. Shinada, and stores the positions of these addressees. This facsimile apparatus then produces two sets of received data, one for Mr. Toda and one for Mr. Ishida, respectively, as illustrated in FIGS. 22(1) and 22(2) by way of example. It will be seen that a mark (framework) is given for the addressee Mr. Toda in the first set and for the addressee Mr. Shinada in the second set.

In the sixteenth embodiment, as described above, the destination as the name of the receiving station, is registered in the name of district. In the seventeenth embodiment, however, the destination, as the name of the receiving station, is registered in the name of department of a company.

In this case, the process is substantially the same as that shown in FIG. 20, except that the "district name" is substituted by "name of department" in the blocks of Steps S422, S424 and S430. Obviously, the destinations SHINJUKU, SHIMOMARUKO and AMI in FIGS. 21 and 22 are to be substituted by, for example, FACSIMILE MARKETING/ PLANNING DEPT., FACSIMILE DEVELOPING DEPT. and FACSIMILE PRODUCTION DEPT.

In the eighteenth embodiment, individual names are used for the destinations in place of the district names and department names used in the sixteenth and seventeenth embodiments.

More practically, the district name in Steps S422, S424 and S430 appearing in FIG. 20, are to be changed to individual names, and SHINJUKU, SHIMOMARUKO and AMI in FIGS. 21 and 22 are to be substituted by "Mr. Yoshida and Mr Ishida" "Mr Toda and Mr Shinada" and "Mr Eda and Mr. Wada", respectively.

A nineteenth embodiment is similar to the sixteenth to eighteenth embodiments, except that each receiving facsimile apparatus produces, in addition to one set of record of the received picture data, a plurality of sets of output record only for persons or addressees which are written in the position for specific or attribute information, e.g., to the persons whose names are written after "c.c."

For instance, the nineteenth embodiment is carried out basically in the same way as the sixteenth embodiment in which district names are used to indicate the destinations, wherein a plurality of sets of output record are produced only for the persons who are mentioned after "c.c.".

Thus, the nineteenth embodiment relies upon the control process explained above in connection with FIG. 20. The original picture data to be sent from the sending facsimile is shown in FIG. 23 by way of example. It will be seen that the destinations to be called are SHINJUKU, SHIMO-MARUKO and AMI.

The receiving and output of the information performed by the facsimile apparatus at SHIMOMARUKO are conducted in the following manner. The facsimile apparatus, upon receipt of the data, performs character recognition to recognize that the received data is to be printed and delivered to persons whose names appear after "c.c.", i.e., Mr. Harada and Mr. Senda, and stores the positions where such names are written. The facsimile apparatus then produces one set of output record as it is. At the same time, output records are produced for the persons whose names are written after "c.c.".

Thus, one set of the data with a unique mark given to Mr. Harada, as well as one set of the data with a unique mark given to Mr. Senda, are produced, so that these two sets of the output record are delivered to Mr. Harada and Mr. Senda.

As will be understood from the foregoing description, the present invention offers various advantages.

First, it is to be noted that since the invention switches the output mode to a mode for producing only one set of output record when the number of the recording paper sheets remaining in the facsimile apparatus has been decreased, it is possible to prevent the consumption of a large number of recording paper sheets which otherwise may occur when the output is conducted in the multi-output record mode, thus avoiding any output failure attributable to exhaustion of the recording paper sheets.

In addition, according to the invention, it is possible to restrain or suspend the multi-output recording mode when the number of the recording paper sheets remaining in the facsimile apparatus has become small, so as to ensure that data which may arrive later through any subsequent communication or communications, and which may contain important information, are received without fail.

Furthermore, according to the present invention, the facsimile at the receiving station automatically recognizes, through character recognition, the destination and addressees written in the data transmitted, and automatically produces a plurality of sets of output record corresponding to the number of the recognized addressees, if only the operator of the transmitting facsimile apparatus writes the destinations and addressees and dials or appoints the destinations to be called. Thus, the present invention provides a facsimile apparatus which is easy to use, through saving of human labor which hitherto has been necessitated both at =the sending and receiving stations.

What is claimed is:

1. A facsimile apparatus comprising:

recognizing means for recognizing an amount of recording sheets remaining in said facsimile apparatus;

recording means for recording, on the recording sheets, at least one set of a record of received image data;

setting means for setting said recording means to record a plurality of sets of the record of the received image data;

control means for controlling said recording means to record only one set of the received image data on the recording sheets regardless of a status of the setting by said setting means in accordance with the amount of the recording sheets recognized by said recognizing means; and indicating means for indicating that, although the received image data is designated for recording in plural sets, only one set of the record has been produced.

2. A facsimile apparatus according to claim 1, wherein said indicating means indicates information identifying a sender from which the received image data has been sent.

3. A facsimile apparatus according to claim 1, wherein said recognizing means recognizes a number of the recording sheets remaining in said facsimile apparatus for each of a plurality of types of the recording sheets of different sizes.

4. A facsimile apparatus according to claim 1, wherein said indicating means includes an alarm.

5. A facsimile apparatus according to claim 1, wherein said indicating means includes display means for displaying the indication.

6. A facsimile apparatus according to claim 1, wherein said indicating means causes said recording means to record the indication on the one set of the record.

7. A facsimile apparatus according to claim 6, wherein said indicating means adds the indication to the received image data so that the content is recorded on the one set of the record by said recording means.

8. A facsimile apparatus according to claim 6, wherein said indicating means adds the indication to image data indicating a report of the communication result so that the indication is recorded on the one set of record recorded on the recording sheets by said recording means.

9. A facsimile apparatus according to claim 1, wherein said recognizing means recognize a number of the recording sheets remaining in said facsimile apparatus regardless of the size of the recording sheets.

10. A facsimile apparatus according to claim 9, wherein said recognizing means recognizes, as the number of the sheets remaining in the facsimile apparatus, the sum of the numbers of sheets of different sizes remaining in said facsimile apparatus.

11. A facsimile apparatus according to claim 10, further comprising storage means for storing the received image data.

12. A facsimile apparatus comprising:

recognizing means for recognizing an amount of recording sheets remaining in said facsimile apparatus;

recording means for recording, on the recording sheets, at least one set of a record of received image data, wherein said recording means, when image data is received from a registered sender, performs recording of a predetermined number of sets of the record, whereas, when image data is received from a sender which has not been registered, said recording means performs recording of one set of the record;

setting means for setting said recording means to record a plurality of sets of the record of the received image data; and control means for controlling said recording means to record only one set of the received image data on the recording sheets regardless of a status of the setting by said setting means in accordance with the amount of the recording sheets recognized by said recognizing means.

13. An image recording method comprising the steps of:
recognizing an amount of remaining recording sheets on which image data is to be recorded;

setting recording of a plurality of sets of the image data;

recording only one set of the image data regardless of a status of the setting in said setting step in accordance with the results of recognition in said recognizing step; and indicating that only one set of the image data has been recorded regardless of the status of the setting in said setting step.

14. The image recording method according to claim 13, wherein it is recognized in said recognizing step whether or not the amount of the remaining recording sheets is not greater than a predetermined value.

15. A facsimile apparatus comprising:
first recognizing means for recognizing an amount of recording sheets remaining in said facsimile apparatus;

second recognizing means for recognizing a number of pages of image data received by said facsimile apparatus;

recording means for recording at least one set of a record of the received image data;

setting means for setting said recording means to record a plurality of sets of the record of the received image data; and control means for controlling said recording means to produce only one set of the record regardless of a status of the setting means in accordance with results of recognition by said first and second recognizing means, wherein said control means controls said recording means to produce only one set of the record of the received image data when a number recognized by said first recognition means is not greater than a predetermined first number and when a number recognized by said second recognizing means is not less than a predetermined second number.

16. A facsimile apparatus according to claim 15, wherein said recording means produces a predetermined plural number of sets of record.

17. A facsimile apparatus comprising:
first recognizing means for recognizing an amount of recording sheets remaining in said facsimile apparatus;

second recognizing means for recognizing a number of pages of image data received by said facsimile apparatus;

recording means for recording at least one set of a record of the received image data, wherein said recording means produces a predetermined plural number of sets of record;

setting means for setting said recording means to record a plurality of sets of the record of the received image data; and control means for controlling said recording means to produce only one set of the record regardless of a status of the setting means in accordance with results of recognition by said first and second recognizing means, wherein said control means controls said recording means to produce only one set of record when a product of the predetermined plural number of sets of record and the number recognized by said second recognizing means exceeds the number recognized by said first recognizing means.

18. A control method comprising the steps of:
recognizing an amount of recording sheets remaining in the facsimile apparatus;

setting recording means of the facsimile apparatus to record a plurality of sets of received image data;

recording only one set of the received image data by the recording means regardless of a status of the setting made in the setting step in accordance with the amount of the recording sheets recognized in said recognizing step; and indicating that only one set of the received image data has been recorded by the recording means regardless of the status of the setting made in said setting step.

19. The control method according to claim 18, wherein said recognizing step recognizes whether or not the amount of recording sheets remaining is not greater than a predetermined value.

20. An image recording apparatus comprising:
recognizing means for recognizing an amount of recording sheets remaining in said apparatus;

recording means for recording, on the recording sheets, at least one set of a record of image data;

setting means for setting said recording means to record a plurality of sets of the record of the image data;

control means for controlling said recording means to produce only one set of the record of image data regardless of a status of the setting by said setting means in accordance with the amount of said recording sheets recognized by said recognizing means; and indicating means for indicating that, although the image data is designated for recording in plural sets, only one set of the record has been produced.

21. An image recording apparatus according to claim 19, wherein said indicating means includes an alarm.

22. An image recording apparatus according to claim 20, wherein said indicating means causes said recording means to record the indication on said recording sheet.

* * * * *

UNITED STATES PATENT AND TRADEMARK OFFICE
CERTIFICATE OF CORRECTION

PATENT NO. : 5,619,344

DATED : April 8, 1997

INVENTOR(S) : TAKEHIRO YOSHIDA, ET AL.

Page 1 of 3

It is certified that error appears in the above-identified patent and that said Letters Patent is hereby corrected as shown below:

IN THE DRAWINGS

Sheet 2 of 21, FIG. 2, "PLUEAL" should be --PLURAL--;
Sheet 3 of 21, FIG. 3, "PREPATORY" should be --PREPARATORY--;
Sheet 8 of 21, FIG. 11, "OUTUT" should be --OUTPUT--;
Sheet 12 of 21, FIG. 15, "THERE OF" should be --THEREOF--; and
Sheet 16 of 21, FIG. 19, "CORCUIT" should be --CIRCUIT--.

COLUMN 1

Line 33, "many" should read --as many--.

COLUMN 3

Line 49, "V27 ter" should read --V27ter--.

COLUMN 4

Line 14, "control signal" should read --a control signal--;
Line 32, "side" should read --size--; and
Line 40, "sheet" should read --sheets--.

COLUMN 5

Line 47, "was" should read --were--.

COLUMN 6

Line 26, "sinal" should read --signal--;
Line 51, "signal" should read --a signal--;
Line 59, "repetition" should read --repetitous--;
Line 60, "equals to" should read --equals--;
Line 62, "produce," should read --produced--.

UNITED STATES PATENT AND TRADEMARK OFFICE
CERTIFICATE OF CORRECTION

PATENT NO. : 5,619,344

DATED : April 8, 1997

INVENTOR(S) : TAKEHIRO YOSHIDA, ET AL.           Page 2 of 3

It is certified that error appears in the above-identified patent and that said Letters Patent is hereby corrected as shown below:

COLUMN 7

Line 17, "perform" should read --performs--.

COLUMN 8

Line 28, "the Step" should read --Step--;
    Line 61, "Step" should read --¶ Step--; and
    Line 65, "not" should read --is not--.

COLUMN 11

Line 24, "Step" should read --step--; and
    Line 50, "proceeds" should read --proceeds to--.

COLUMN 12

Line 4, "of" should read --of the--; and
    Line 37, "describe" should read --described--;

COLUMN 13

Line 63, "CCD" should read --a CCD--.

COLUMN 15

Line 17, "chats" should read --charts--;
    Line 37, "page" should read --page of--; and
    Line 38, "ben" should read --been--.

COLUMN 16

Line 23, "addresses" should read --addressees--; and
    Line 60, "on the " should read --on--.

UNITED STATES PATENT AND TRADEMARK OFFICE
CERTIFICATE OF CORRECTION

PATENT NO. : 5,619,344

DATED : April 8, 1997

INVENTOR(S) : TAKEHIRO YOSHIDA, ET AL.

It is certified that error appears in the above-identified patent and that said Letters Patent is hereby corrected as shown below:

COLUMN 17

Line 30, "reach" should read --each--; and
    Line 54, "in a" should read --in--.

COLUMN 18

Line 64, "Ishida" " should read --Ishida", --.

COLUMN 19

Line 51, "destination" should read --destinations--; and
    Line 59, "=the" should read --the--.

COLUMN 20

Line 37, "recognize" should read --recognizes--.

COLUMN 22

Line 16, "the" should read --a--; and
    Line 46, "19" should read --20--.

Signed and Sealed this

Eleventh Day of November, 1997

Attest:

BRUCE LEHMAN

Attesting Officer      Commissioner of Patents and Trademarks